(12) United States Patent
Kawamura et al.

(10) Patent No.: US 6,336,001 B1
(45) Date of Patent: Jan. 1, 2002

(54) DIGITAL RECORDING/REPRODUCTION APPARATUS

(75) Inventors: Takeshi Kawamura, Tenri; Hironobu Katayama, Noda, both of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/083,108

(22) Filed: May 22, 1998

(30) Foreign Application Priority Data

May 23, 1997 (JP) .............................................. 9-134082

(51) Int. Cl.$^7$ ................................................ H04N 5/95
(52) U.S. Cl. .............................. 386/85; 386/90; 386/93
(58) Field of Search ............................. 386/46, 47, 85, 386/90, 93, 113, 116, 124, 88; 360/51, 27, 32; H04N 5/95

(56) References Cited

U.S. PATENT DOCUMENTS

| | | | |
|---|---|---|---|
| 5,266,850 A | 11/1993 | Au et al. ..................... | 327/231 |
| 5,347,316 A | * 9/1994 | Ogura ......................... | 386/90 |
| 5,615,059 A | * 3/1997 | Seki et al. .................... | 360/51 |
| 5,673,211 A | 9/1997 | Hayashi et al. ................ | 708/8 |

FOREIGN PATENT DOCUMENTS

| | | |
|---|---|---|
| EP | 03 32079 A2 | 9/1989 |
| EP | 05 84727 A2 | 3/1994 |
| EP | 06 11155 A2 | 8/1994 |
| GB | 2 199470 A | 7/1988 |
| JP | 6 162691 | 6/1994 |
| JP | 6 259891 | 9/1994 |

* cited by examiner

Primary Examiner—Huy Nguyen

(57) ABSTRACT

A digital recording/reproduction method and apparatus includes a data detection circuit for detecting a frequency of occurrence of a specific data value contained in an information signal, and a phase controller for controlling a phase of a sampling clock based on the frequency of occurrence of the specific data value detected by the data detection circuit. A threshold value in the data detection circuit is adjusted to maximize the frequency of occurrence of the specific data value contained in the information signal, and the phase of the sampling clock is controlled to minimize the amount of change in the frequency of occurrence of the specific data value contained in the information signal.

21 Claims, 21 Drawing Sheets

FIG. 21
Recording signal
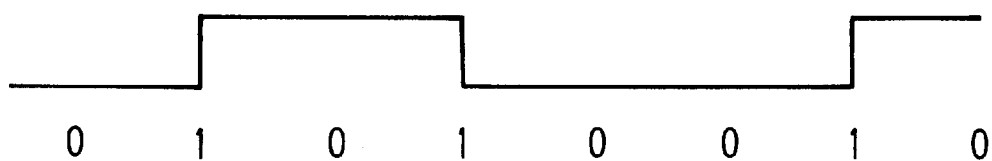
0   1   0   1   0   0   1   0
Reproduced waveform
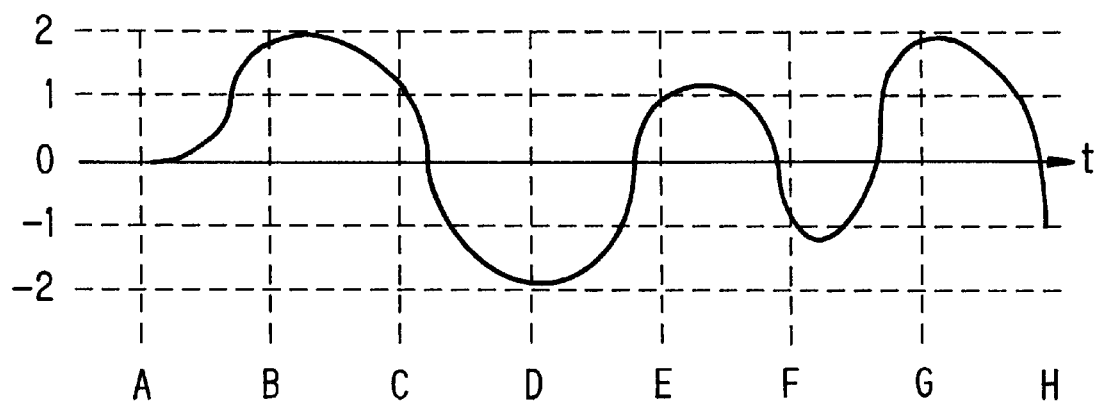
Reproduction without Viterbi decording ( erroneous detection )
0   1   1   1   0   1   1   0
Reproduction without Viterbi decording
Correct detection result
0   1   0   1   0   0   1   0

DIGITAL RECORDING/REPRODUCTION APPARATUS

BACKGROUND OF THE INVENTION (1) Field of the Invention

The present invention relates to a digital recording/reproduction apparatus for reproducing information in a digital signal recorded on a recording medium.

(2) Description of the Prior Art

In a digital video tape recorder, there is known a partial response/class 4 as a method for digitalizing and recording a video signal on a recording medium such as a magnetic tape and the like. With this method, the video signal digitalized and recorded can be decoded using Viterbi decoding.

However, since the Viterbi decoding is for processing a digital signal, when the Viterbi decoding is performed, in order to perform quantization, it is necessary to convert the reproduction signal reproduced from the recording medium from the analog signal to the digital signal, using a sampling clock of a predetermined sampling rate.

In this case, if the phase of the sampling clock is not proper, the reproduction signal in the analog form cannot be quantized properly. Particularly, in the case of the Viterbi decoding, since it is for discriminating the decoded data and correcting errors according to the amplitude level, if the phase of the sampling clock is shifted and the amplitude level is not correctly converted, a code error occurs.

Specifically speaking, for example in FIG. 21, when the recording signal is "0, 1, 0, 1, 0, 0, 1, 0", if the reproduced waveform is simply detected with the threshold of "1" and "−1" (reproduction without Viterbi decoding), the detection result becomes "0, 1, 1, 1, 0, 1, 1, 0".

On the contrary, if the reproduced waveform in FIG. 21 is detected using the Viterbi decoding, when there is a "peak" where the amplitude level is higher than point B or a "valley" where it is lower than point B, after the amplitude level at point B exceeds the threshold "1" and from point C downward, "1" will be determined as the data at point B. At point C, the amplitude level is higher than the threshold "1", but lower than point B, hence the data at point C is not determined.

At the next point D, the amplitude level becomes lower than "−1", and for the first time, "1" is determined as the data at point B, and "0" is determined as the data at point C. However, the data at point D is not determined at this moment. In order to determine the data at point D, it is necessary to have a "valley" where the amplitude level is lower than the threshold point D or a "peak" where it is higher than "1" at point E or downward.

Then, at point E, since the amplitude level does not exceed "1", the data at point D is not yet determined. At the next point F, since the amplitude level is not lower than the amplitude level at point D, the data at point D is not yet determined. It is not until the amplitude level at the next point G exceeds "1" that "−1" is determined as the data at point D, "0" is determined as the data at point E, and "0" is also determined as the data at point F, respectively.

As described above, with the Viterbi decoding, decoding is performed by detecting the amplitude level of the reproduced waveform, hence the detection accuracy of the amplitude level is quite important. The amplitude level of the reproduced waveform is determined at a time position of point A and the like in the reproduced waveform shown in FIG. 21, and the time position is determined by the phase of the sampling clock signal, hence the detection accuracy of the amplitude level depends largely on the phase of the sampling clock.

For example, when the phase of the sampling clock signal is delayed, there is a case where the amplitude level at point E exceeds the threshold "1". In this case, the data at point E will be erroneously detected as "1", and the data at point F will be erroneously detected as "−1".

Thus, the phase adjustment of the sampling clock is quite important for enhancing the detection accuracy of the amplitude level in the reproduced waveform.

In the conventional apparatus, the phase adjustment of the sampling clock signal is performed by an operator on the production stage, and it takes time for adjusting the phase. Moreover, since the phase of the sampling clock signal is fixed to a value adjusted on the production stage, when tapes having different properties are reproduced due to the property difference between tape manufacturers or the difference between lots, the optimum phase point is shifted, causing a problem that the detection accuracy of the amplitude level in the reproduced waveform is decreased.

There is known a method in which even if kinds of magnetic tapes and properties of magnetic heads change, the optimum point of the clock phase is automatically searched using a mean value in the error rate of the reproduction data (Japanese Patent Application Laid-open Hei 2 No. 259891), as a conventional method for adjusting the phase of the sampling clock signal to the optimum point.

However, when the error rate is $10^{-5}$, for example, an error occurs at a rate of once for every 100,000, hence it is necessary to read at least 1,000,000 data in order to accurately count the error rate. When the error rate becomes $10^{-6}$, an error occurs at a rate of once for every 1,000,000, hence it is necessary to obtain at least 10,000,000 data.

Therefore, according to the conventional method, it is necessary to read much more data in order to adjust the sampling clock phase to the appropriate point. However, since the error rate becomes low as the sampling clock phase approaches the appropriate value, the data quantity to be read or the calculation time of the error rate increases exponentially. Accordingly, there has been such a problem that as the optimum condition is aimed, much time is required.

SUMMARY OF THE INVENTION

With a view to solving the above problems, it is an object of the present invention to provide a digital recording/reproduction apparatus which can quickly adjust the phase of the sampling clock signal for quantizing the reproduced waveform of the video signal to an optimum value.

In order to attain the above objectives, the present invention has the following construction.

The digital recording/reproduction apparatus according to the invention as set forth in the first aspect is a digital recording/reproduction apparatus which quantizes and decodes the information signal reproduced from a recording medium based on a sampling clock, and is characterized in that it includes detection means for detecting the frequency of occurrence of data contained in the information signal, and phase control means for controlling the phase of the sampling clock based on the frequency of occurrence of data detected by the detection means.

The digital recording/reproduction apparatus according to the invention as set forth in the second aspect has a structure of the digital recording/reproduction apparatus according to the first aspect, wherein the detection means includes means for comparing the information signal with the threshold and converting it into a binary format, and threshold control means for controlling the threshold based on the frequency of occurrence of either one of the two theoretical values contained in the output of the means for converting into a binary format.

The digital recording/reproduction apparatus according to the invention as set forth in the third aspect has a structure of the digital recording/reproduction apparatus according to the first aspect, wherein the phase control means controls the phase of the sampling clock based on the detection results of the detection means, so that the frequency of occurrence of data contained in the signal obtained by quantizing the information signal based on the positive phase signal of the sampling clock is made maximum, or the frequency of occurrence of data contained in the signal obtained by quantizing the information signal based on the negative phase signal of the sampling clock is made minimum.

The digital recording/reproduction apparatus according to the invention as set forth in the fourth aspect has a structure of the digital recording/reproduction apparatus according to the first aspect, wherein the detection means includes means for comparing the information signal with the threshold and converting it into a binary format, and threshold control means for controlling the threshold based on the frequency of occurrence of either one of the two theoretical values contained in the output of the means for converting into a binary format, the phase control means controlling the phase of the sampling clock based on the detection results of the detection means, so that the frequency of occurrence of data contained in the signal obtained by quantizing the information signal based on the positive phase signal of the sampling clock is made maximum, or the frequency of occurrence of data contained in the signal obtained by quantizing the information signal based on the negative phase signal of the sampling clock is made minimum.

The digital recording/reproduction apparatus according to the invention as set forth in the fifth or sixth aspect has a structure of the digital recording/reproduction apparatus according to the second or fourth aspect, wherein the threshold control means controls the threshold so that the frequency of occurrence is made minimum based on the amount of change in the frequency of occurrence of either one of the two theoretical values contained in the output of the means for converting into a binary format.

The operation of the present invention will now be described.

According to the digital recording/reproduction apparatus relating to the invention as set forth in the first aspect, the detection means detects the frequency of occurrence of data contained in the information signal reproduced from a recording medium and provides it to the phase control means. The phase control means controls the phase of the sampling clock for quantizing the information signal, based on the frequency of occurrence of data contained in the information signal. For example, attention is given to the fact that the amount of change in the frequency of occurrence of data contained in the information signal with respect to the sampling clock has a certain correlation with an error in this data, and the phase of the sampling clock is determined so that the amount of change in the frequency of occurrence of data becomes minimum.

According to the digital recording/reproduction apparatus relating to the invention as set forth in the second aspect, the means for converting into a binary format constituting the detection means compares the information signal with the threshold, and for example, when the information signal is larger than the threshold, the theoretical value is designated as 1, and when the information signal is smaller than the threshold, the theoretical value is designated as 0. The threshold control means determines the threshold based on the frequency of occurrence of the theoretical value 0 or 1. Thus, the threshold at the time of converting the information signal into a binary format is determined with the detection means.

According to the digital recording/reproduction apparatus relating to the invention as set forth in the third aspect, the phase control means controls the phase of the sampling clock based on the detection results of the detection means, so that the frequency of occurrence of data contained in the signal obtained by quantizing the information signal based on the positive phase signal of the sampling clock (normally rotated clock) is made maximum, or the frequency of occurrence of data contained in the signal obtained by quantizing the information signal based on the negative phase signal of the sampling clock (inversely rotated clock) is made minimum.

According to the digital recording/reproduction apparatus relating to the invention as set forth in the fourth aspect, the means for converting into a binary format constituting the detection means compares the information signal with the threshold, to convert the information signal into a binary format. The threshold control means determines the threshold based on the frequency of occurrence of the theoretical value 0 or 1 obtained by the means for converting into a binary format.

When the threshold of the detection means is determined, the phase control means controls the phase of the sampling clock, so that the frequency of occurrence of data contained in the signal obtained by quantizing the information signal based on the positive phase signal of the sampling clock is made maximum, or the frequency of occurrence of data contained in the signal obtained by quantizing the information signal based on the negative phase signal of the sampling clock is made minimum.

According to the digital recording/reproduction apparatus relating to the invention as set forth in the fifth or sixth aspect, the threshold control means sets up the threshold so that the amount of change in the frequency of occurrence of data is made minimum. Therefore, when a quenching error or an insertion error has a characteristic that it approaches zero in an area having a small amount of change in the frequency of occurrence of data, the set threshold controls the frequency of occurrence of the quenching error or the insertion error, thereby it becomes the most adequate threshold for the detection means.

BRIEF DESCRIPTION OF THE DRAWINGS

FIG. 21 is a diagram for explaining the principle of the Viterbi decoding.

DESCRIPTION OF THE PREFERRED EMBODIMENTS

Normally, when a magnetic tape is used as a recording medium, the number of errors appeared in the reproduced data is only one for every 10,000 or 100,000, but the number of "1" and "−1" appeared as the data accounts for about one fourth of the whole data. In the present invention, attention is given to "1" and "−1" which account for the majority in the whole data, and by analyzing the frequency of occurrence of these data "1" and "−1" to grasp indirectly the frequency of occurrence of the quenching error or the insertion error and to optimally control the phase of the sampling clock.

An embodiment of the present invention will now be described in detail with reference to the accompanying drawings.

Figure 1:
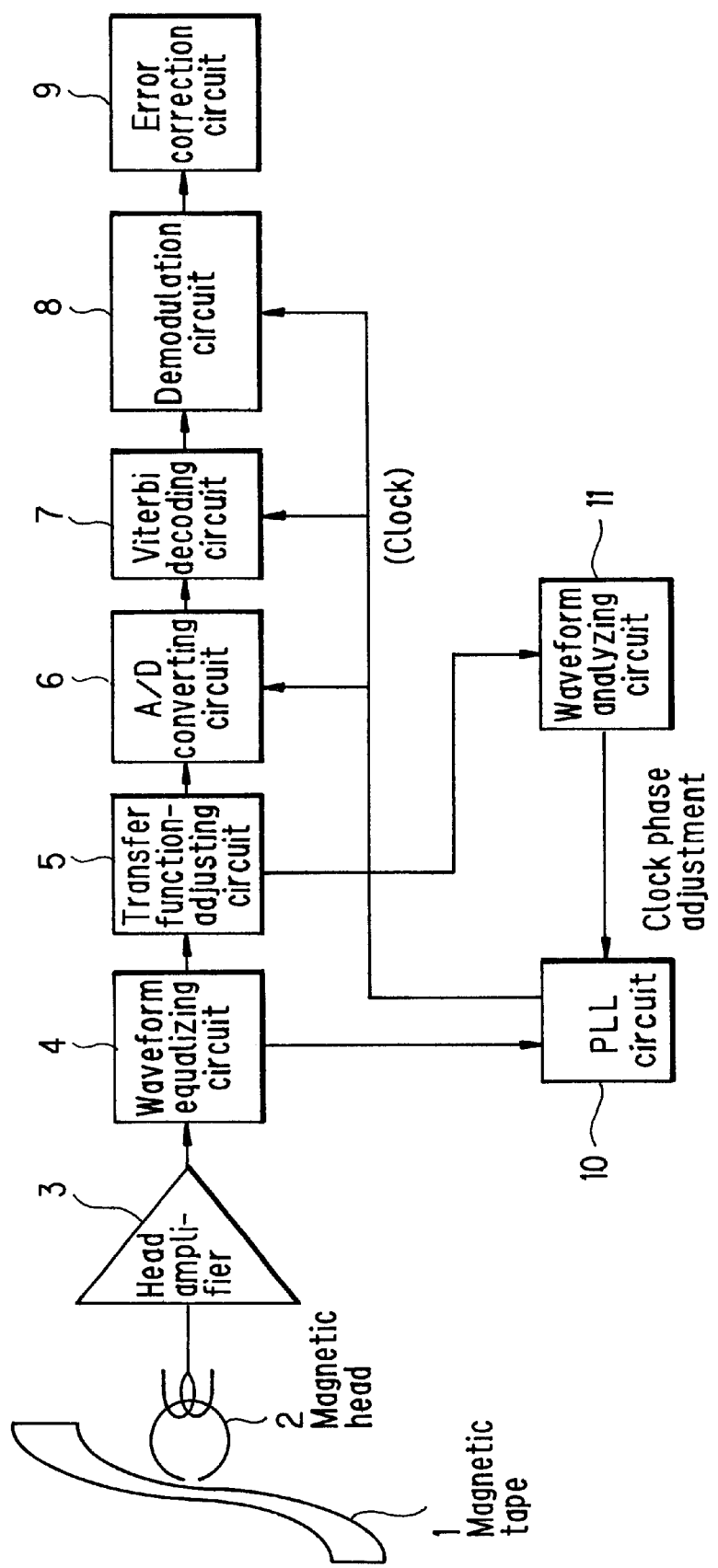
FIG. 1 is a block diagram of the digital recording/reproduction apparatus according to the embodiment of the present invention.

FIG. 1 is a block diagram of the digital recording/reproduction apparatus according to the embodiment of the present invention. In the drawing, numeral 1 denotes a magnetic tape, 2 denotes a magnetic head, 3 denotes a head amplifier, 4 denotes a waveform equalizer, 5 denotes a transfer function-adjusting circuit, 6 denotes an A/D converting circuit, 7 denotes a Viterbi decoding circuit, 8 denotes a demodulation circuit, 9 denotes an error correction circuit, and 10 denotes a PLL circuit. In addition, 11 denotes a waveform analyzing circuit for controlling the phase of a clock generated by the PLL circuit 10 by analyzing the output waveform of the transfer function-adjusting circuit 5, which is the characteristic portion of the present invention.

The operation of the apparatus of this embodiment shown in FIG. 1 will now be described.

Referring to FIG. 1, the digital information recorded on the magnetic tape 1 is converted to an electric signal by the magnetic head 2, and detected as a reproduction signal. This reproduction signal is a faint signal of about 1 mV, therefore, it is amplified to a level in which the signal processing is possible in respective circuits on the post stage. The amplified reproduction signal is equalized to a waveform suitable for the data detection by the waveform equalizing circuit 4.

Here, the waveform equalizing circuit 4 is composed of a phase compensation section and an amplitude compensation section (both have no reference numeral), thereby the reproduction signal is equalized in the waveform.

Figure 2:
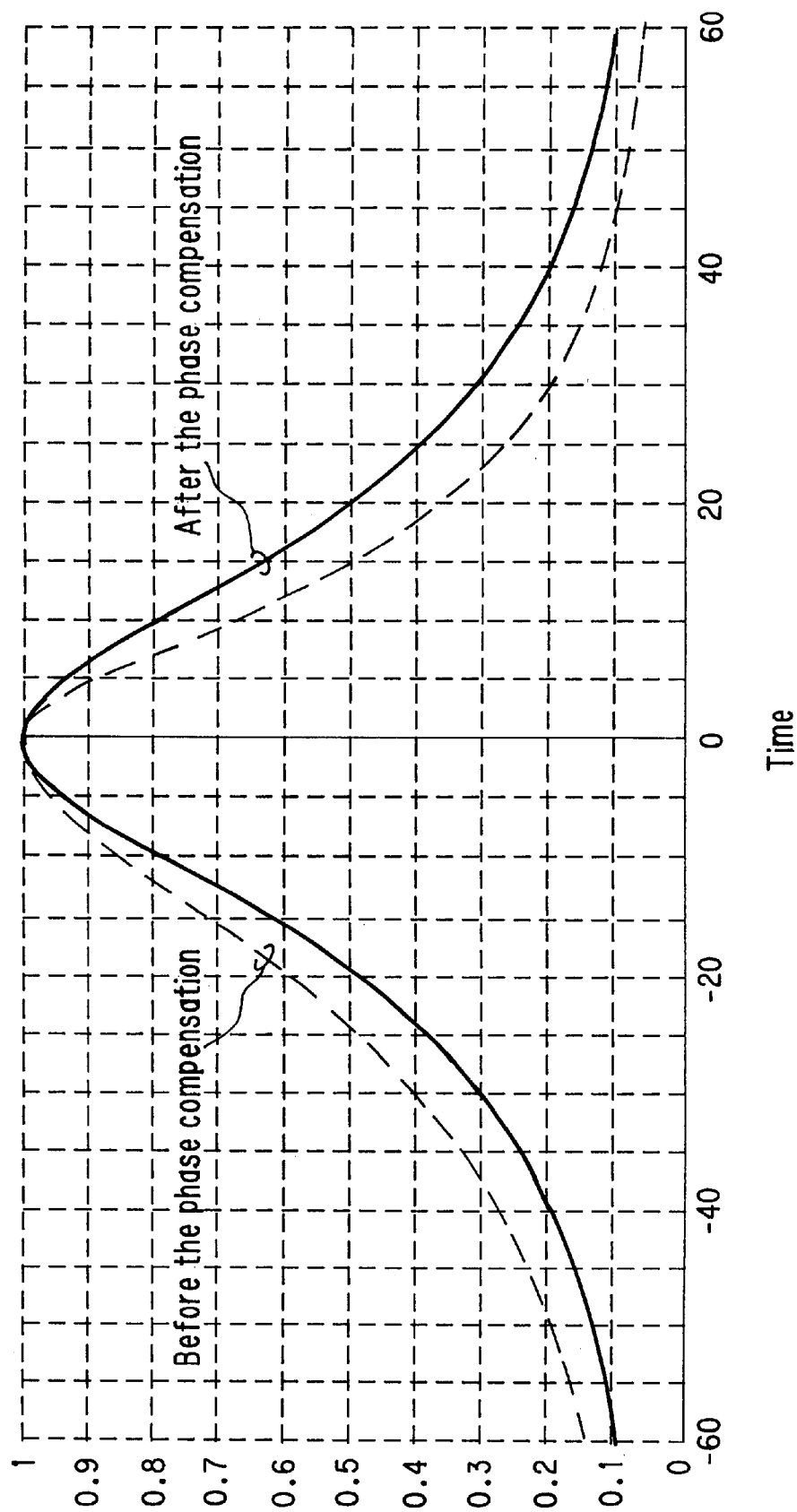
FIG. 2 is a waveform diagram for explaining the waveform equalization (phase compensation) of the digital recording/reproduction apparatus according to the embodiment of the present invention.

That is to say, the magnetic tape has the magnetic anisotropy, thereby the reproduced waveform becomes an asymmetric waveform shown in a broken line in FIG. 2 (before the phase compensation). Therefore, with the phase compensation section of the waveform equalizing circuit 4, the waveform reproduced from the magnetic tape is compensated to an asymmetric form shown in a solid line in FIG. 2 (after the phase compensation).

Figure 3:
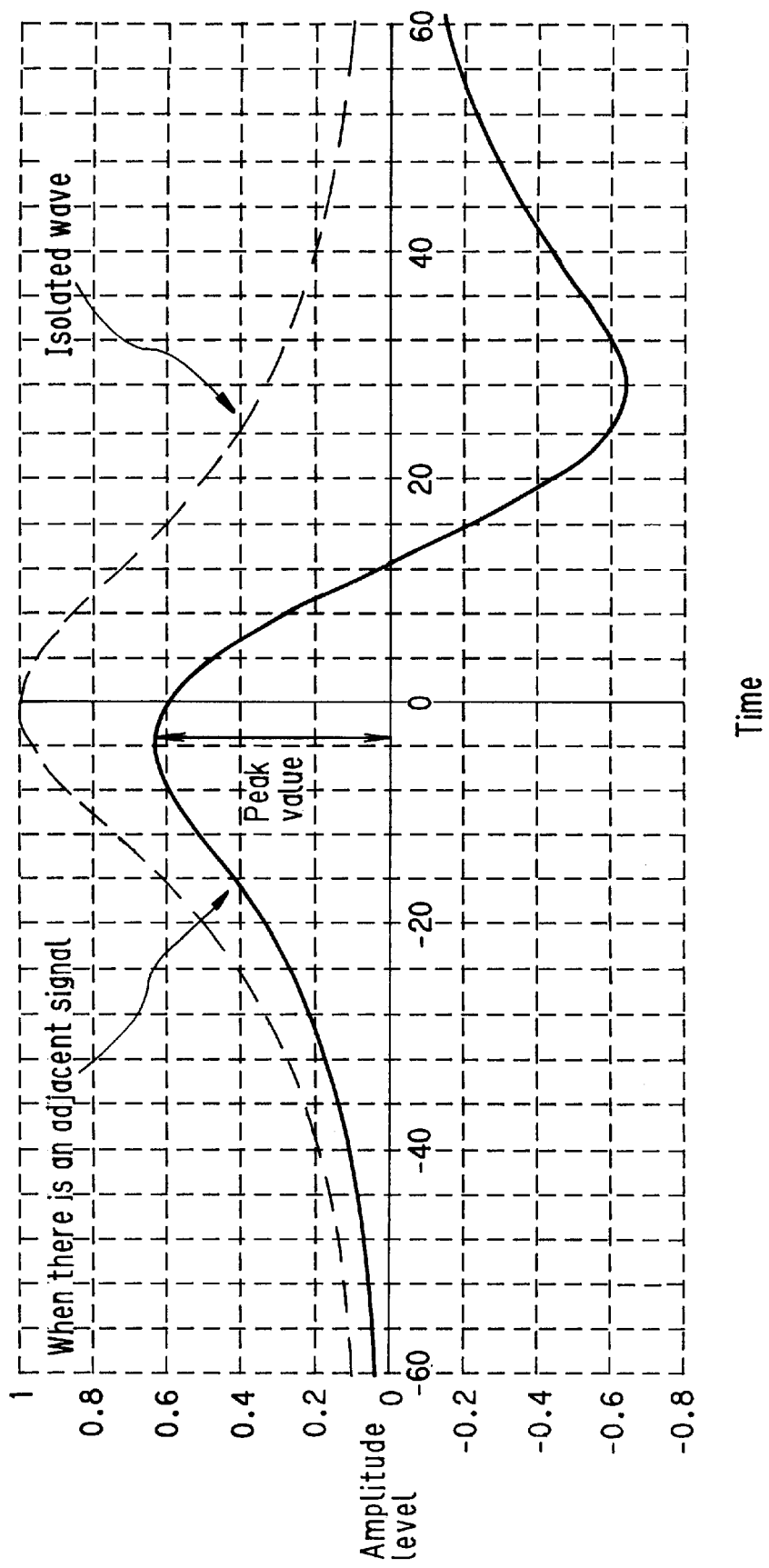
FIG. 3 is a waveform diagram for explaining the waveform equalization (amplitude compensation) of the digital recording/reproduction apparatus according to the embodiment of the present invention.

Furthermore, the reproduced waveform of the digital signal recorded on the recording medium in a high density becomes a waveform having expanding skirts as shown in a broken line in FIG. 3, and when there is an adjacent signal, the peak value decreases due to the interference between waveforms, as shown in a solid like in FIG. 3. Therefore, the expansion of the skirts of the reproduced waveform is suppressed by the amplitude compensation section of the waveform equalizing circuit 4 to narrow the waveform width (waveform width W50 of a half amplitude value), as shown in a solid line in FIG. 4. As the amplitude compensation section, for example, a transversal digital filter or the like can be used.

Then, the PLL circuit 10 generates a clock which defines the operation of the A/D conversion circuit 6, the Viterbi decoding circuit 7 and the demodulation circuit 8, from the reproduction signal whose waveform is equalized by the waveform equalizing circuit 4. On the other hand, the output of the waveform equalizing circuit 4 is input to the transfer function-adjusting circuit 5 having a transfer function of 1+D (D is a transfer delay function), and returned to the original state of the transfer function before the so-called pre-coding (encoding for making the bit interval appropriate so as to coordinate with the tape characteristic at the time of recording).

The output signal of this transfer function-adjusting circuit 5 is converted (quantized) to a digital signal by the A/D conversion circuit 6 using a clock generated by the PLL circuit 10, then is output through the Viterbi decoding circuit 7, the demodulation circuit 8 and the error correction circuit 9. That is, with the Viterbi decoding circuit 7, the data detection is performed by utilizing the ordinality of the digital recording based on the peak value of the reproduced data. With the demodulator 8, the data converted to a signal having a spectrum suitable for the characteristic of the recording medium at the time of recording is returned to the original state. With the error correction circuit 9, encoding error occurred at the time of recording/reproducing to/from the recording medium is corrected.

Then, the operation of the waveform analyzing circuit 11 which controls the phase of the clock (sampling clock) used in the A/D conversion (quantization) with the A/D conversion circuit 6 will now be described in detail.

Figure 5:
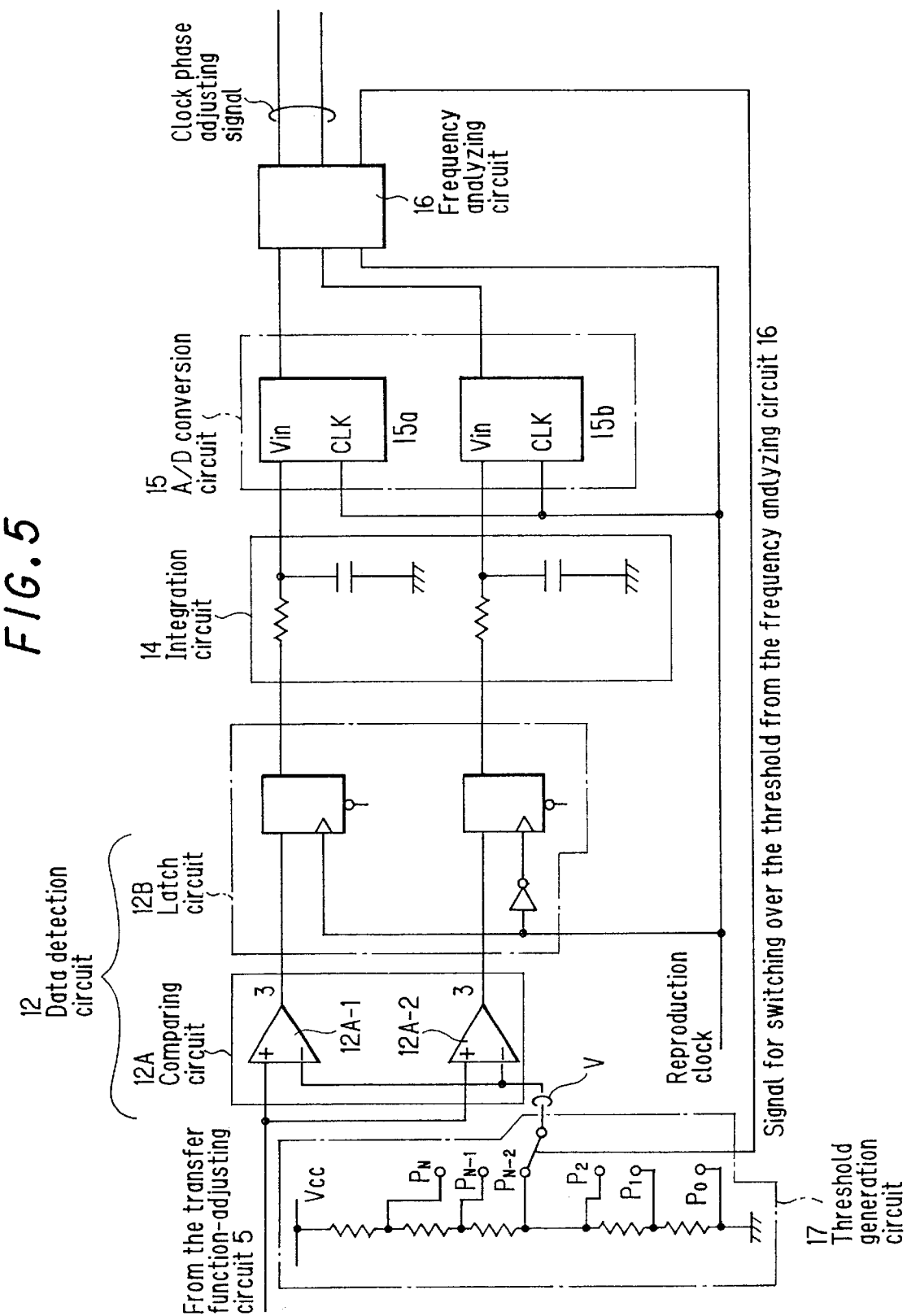
FIG. 5 is a block diagram of a waveform analyzing circuit provided in the apparatus of the present invention.

This waveform analyzing circuit 11 comprises a threshold generation circuit 17, a data detection circuit 12 for detecting data from the output signal of the transfer function-adjusting circuit 5 by comparing with the threshold voltage V generated by the threshold generation circuit 17, an integration circuit 14 for integrating the output of the data detection circuit 12, an A/D conversion circuit 15 for converting the integration results of the integration circuit 14 from analog to digital, and a frequency analyzing circuit 16 for analyzing the frequency of occurrence of data from the output of the A/D conversion circuit 15, as the structure is shown in detail in FIG. 5.

Furthermore, the data detection circuit 12 comprises a comparator circuit 12A and a latch circuit 12B, and compares the output level of the transfer function-adjusting circuit 5 which is an analog signal with the threshold voltage V by a comparator 12A-1 constituting the comparator circuit 12A, and converts it to the digital data in which the area higher than the threshold "1" is designated as data "1", while it converts the signal to the digital data in which the area lower than the threshold "−1" is designated as data "1" by a comparator 12A-2. This data is taken into the latch circuit 12B according to the reproduction clock, and is output as a pulse train shown in FIG. 6, from the data detection circuit 12.

Figure 6:
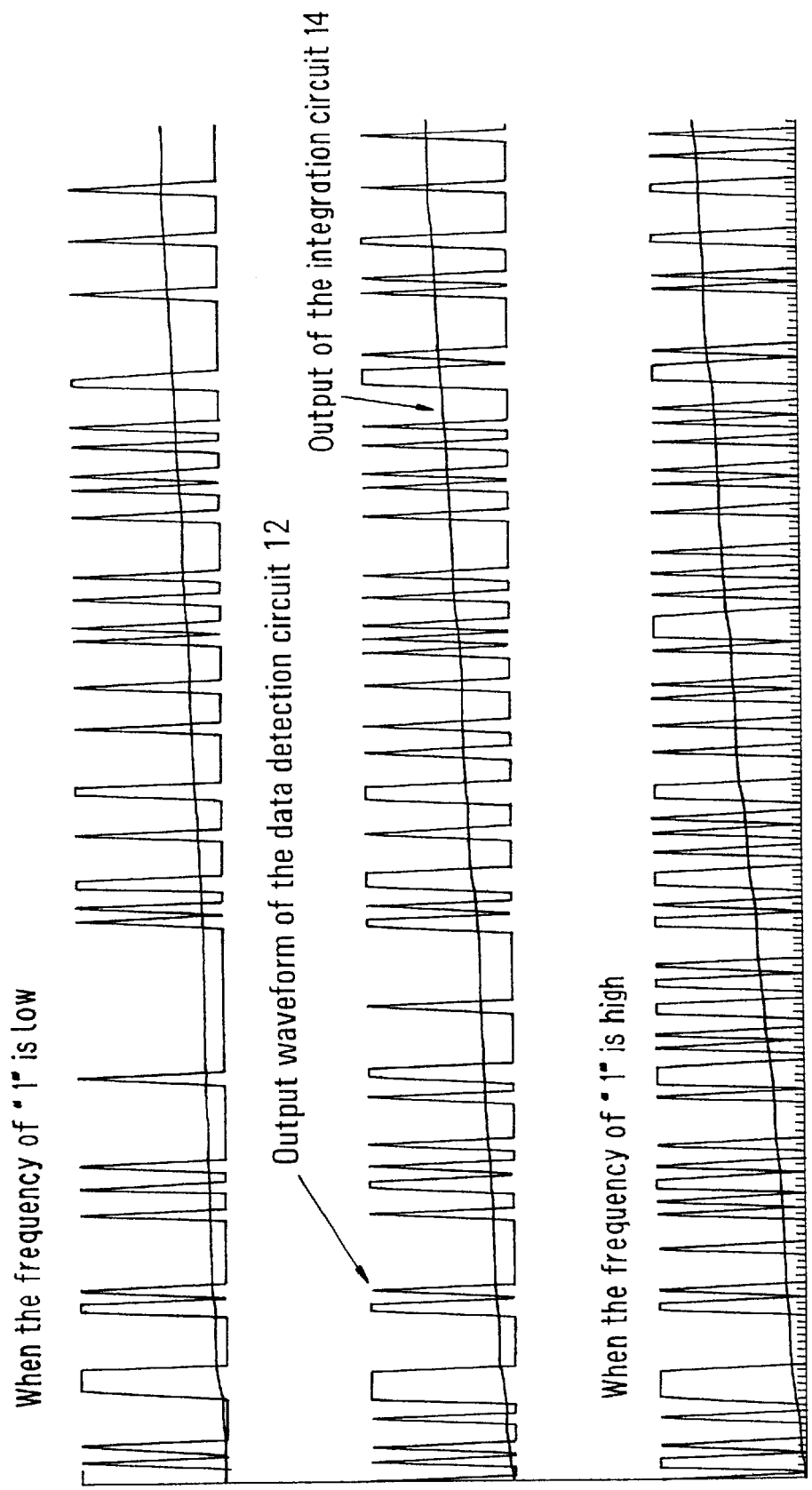
FIG. 6 is a waveform diagram for explaining the operation of the waveform analyzing circuit provided in the apparatus of the present invention.

This pulse train is integrated by the integration circuit 14 and converted to the DC level in response to the frequency of occurrence of data "1". That is to say, when the frequency of occurrence of data "1" increases, as shown in FIG. 6 (the lowermost waveform in FIG. 6), the DC level (the output of the integration circuit 14) becomes high, and when the frequency of occurrence decreases (the uppermost waveform in FIG. 6), the DC level becomes low.

The DC level appeared on the output of the integration circuit 14 is input to the A/D conversion circuit 15, converted to the digital data and is input to the frequency analyzing circuit 16. With the frequency analyzing circuit 16, the frequency analysis of the data "1" is performed, and an optimum threshold is determined and stored as a binary value. The threshold generation circuit 17 switches over based on the binary value to set up an optimum threshold voltage V.

Figure 7:
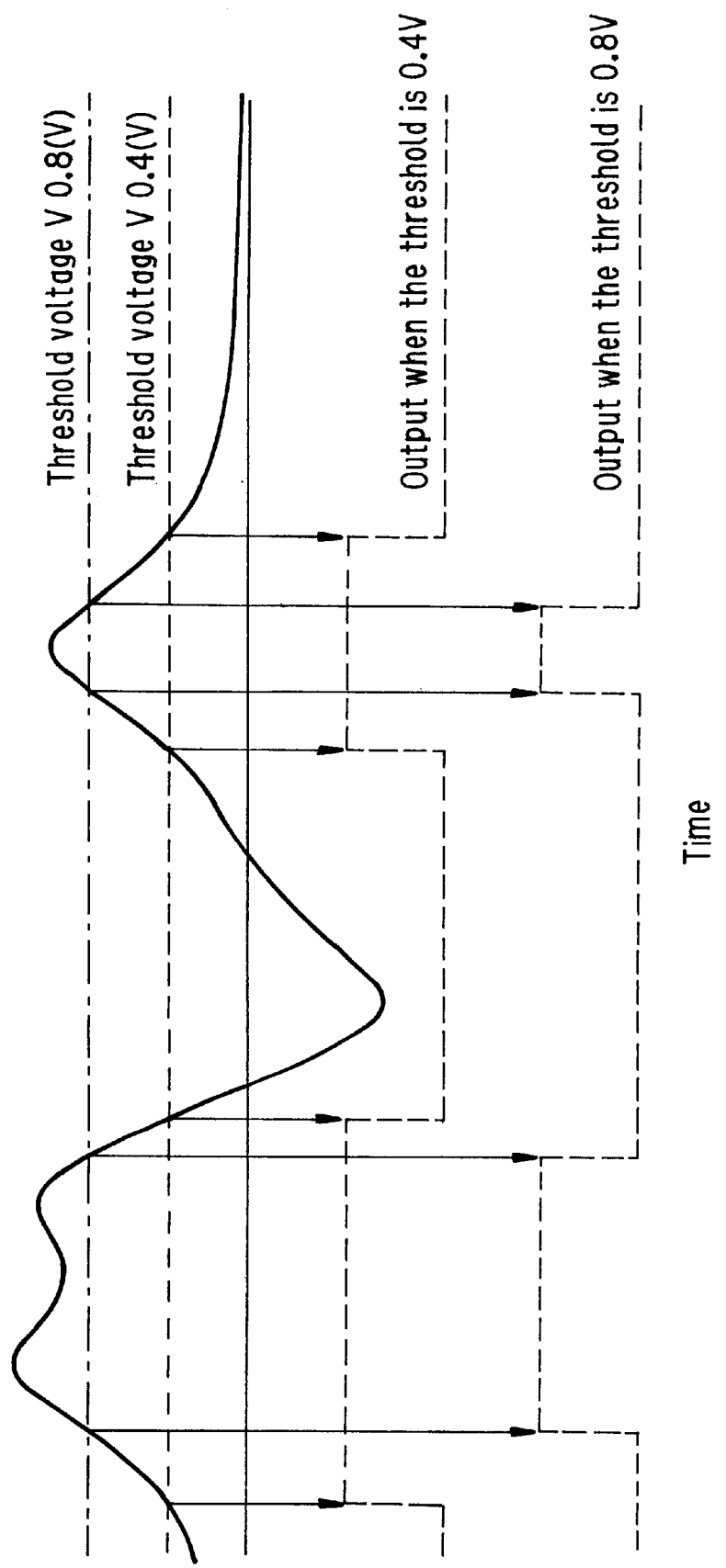
FIG. 7 is a waveform diagram for explaining the operation principle of the waveform analyzing circuit provided in the apparatus of the present invention.

The frequency analysis of the data "1" performed by the frequency analyzing circuit 16 will now be described. As shown in FIG. 7, if the threshold voltage V is lowered (for example, 0.4 V), the error rate that the data detection circuit 12 erroneously detects not only the primary data but also the area in the skirts of the reproduced waveform as data "1" increases, and the frequency of occurrence of data "1" increases (occurrence of the insertion error).

Figure 4:
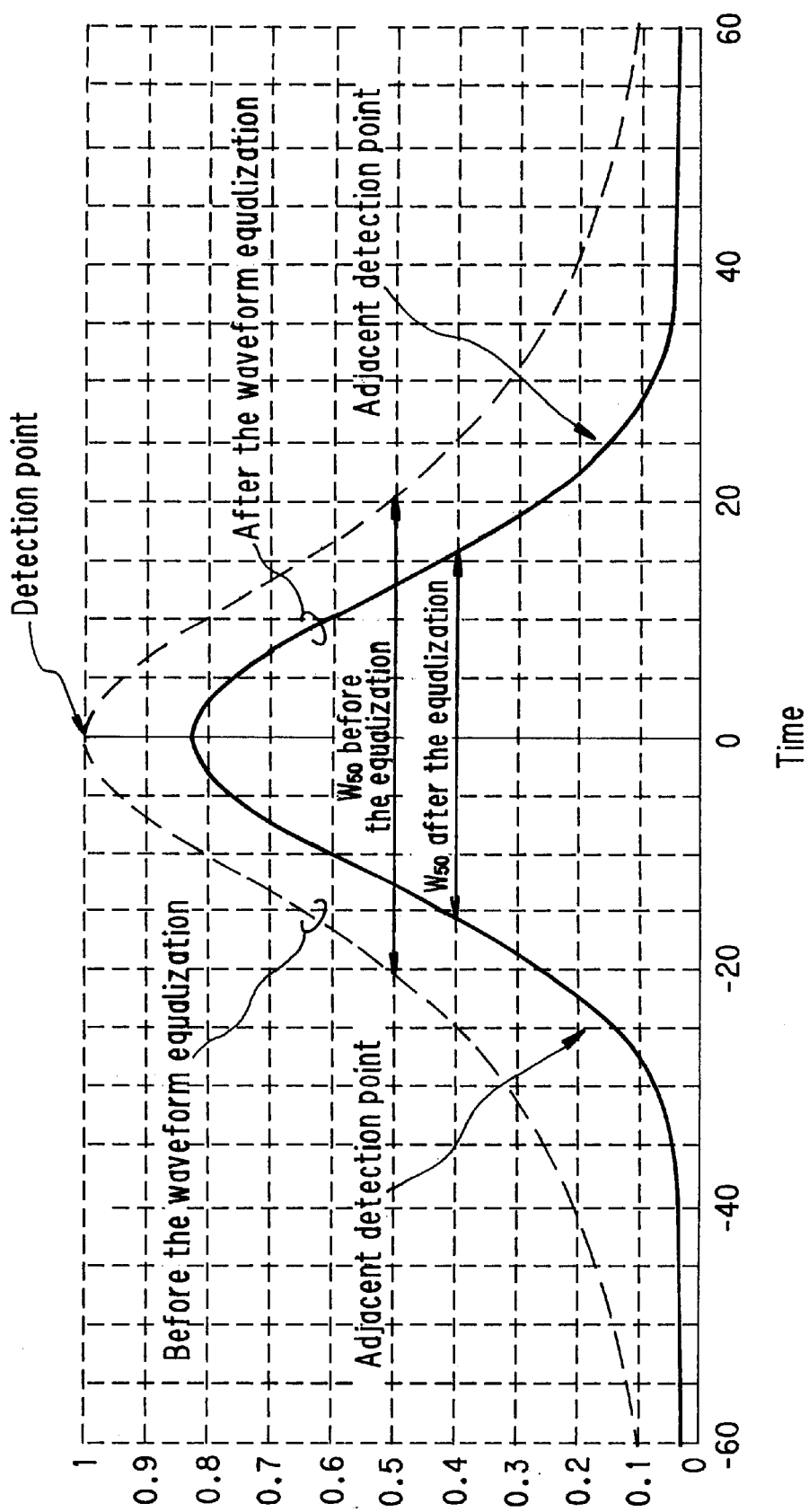
FIG. 4 is a waveform diagram before and after the waveform equalization in the digital recording/reproduction apparatus according to the present invention.
Figure 8:
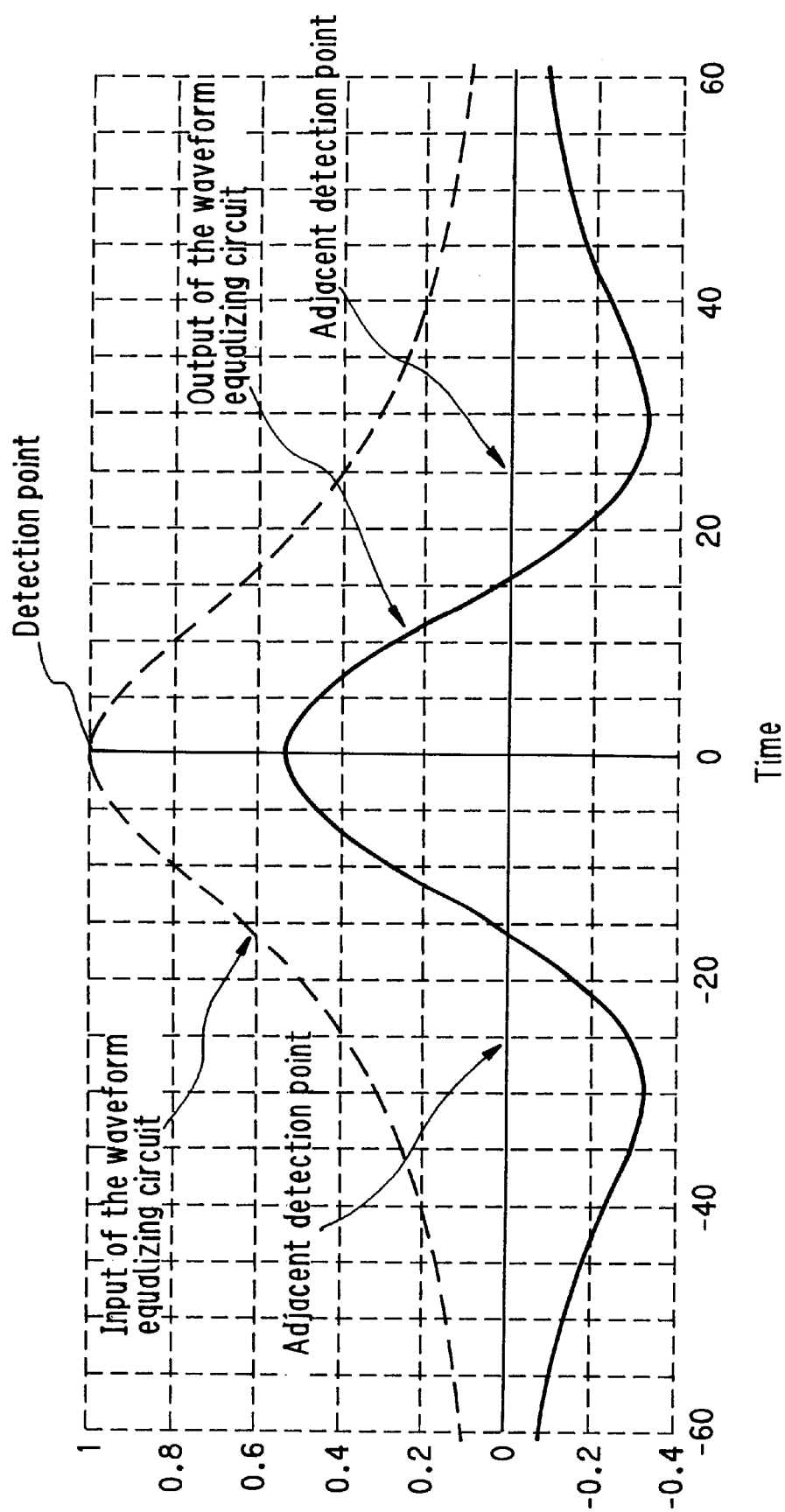
FIG. 8 is a waveform diagram of a waveform equalizing circuit provided in the apparatus of the present invention.

In a state that the waveform is accurately equalized as shown in FIG. 4, the minus side is not detected erroneously, but in a state of waveform equalization in excess of the minus side as shown in FIG. 8, the rebounding in the minus side may be discriminated as data "−1", resulting in the increase of the insertion error.

Returning to FIG. 7, on the contrary, when the threshold voltage V becomes high (for example, 0.8 V), the error rate that the data detection circuit 12 discriminates the signal area of the original data "1" where the peak value decreases due to the interference between the waveforms as data "0" increases, and the frequency of occurrence of data "1" decreases (occurrence of the quenching error).

Thus, the DC level of the integration circuit 14 which changes according to the frequency of occurrence of data "1" has a dependence on the threshold voltage V of the data detection circuit 12. The appearance of the frequency of occurrence of data when the threshold voltage V of the data detection circuit 12 is changed is shown in FIG. 9.

Figure 9:
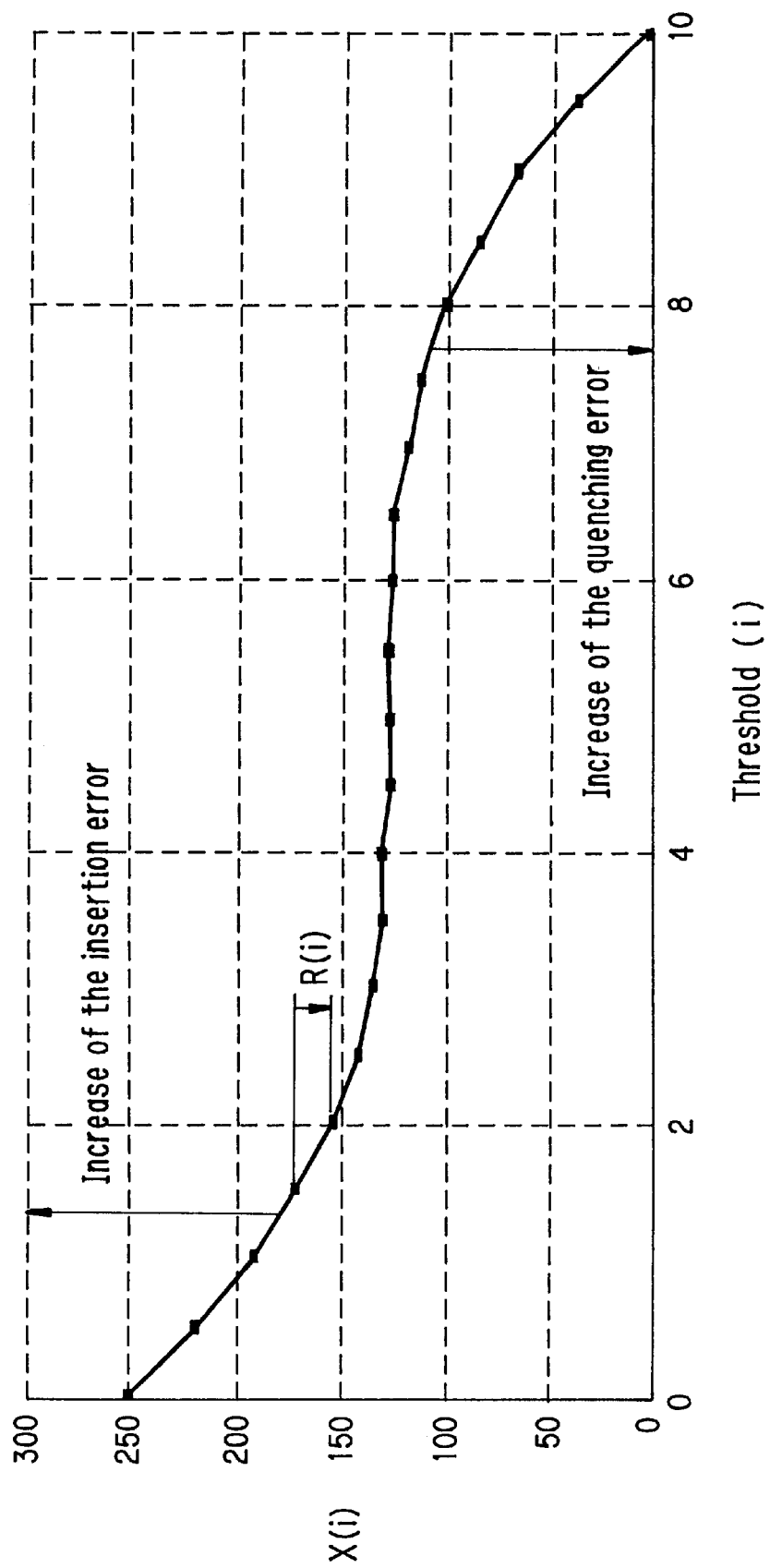
FIG. 9 is a characteristic curve (data frequency with respect to the threshold) for explaining the operation (setting up of the optimum threshold) of the apparatus of the present invention.

In FIG. 9, abscissa represents a step level i of the threshold voltage V described later, and equals to the threshold. Meanwhile, ordinate in FIG. 9 represents the frequency of occurrence X(i) of data "1" with respect to the step level i of the threshold voltage V. As shown in the figure, when the threshold decreases, the insertion error increases, and the frequency of occurrence of data "1" increases by the amount of errors. Moreover, when the threshold increases, the quenching error increases, and the frequency of occurrence of data "1" decreases by the amount of errors.

Figure 10:
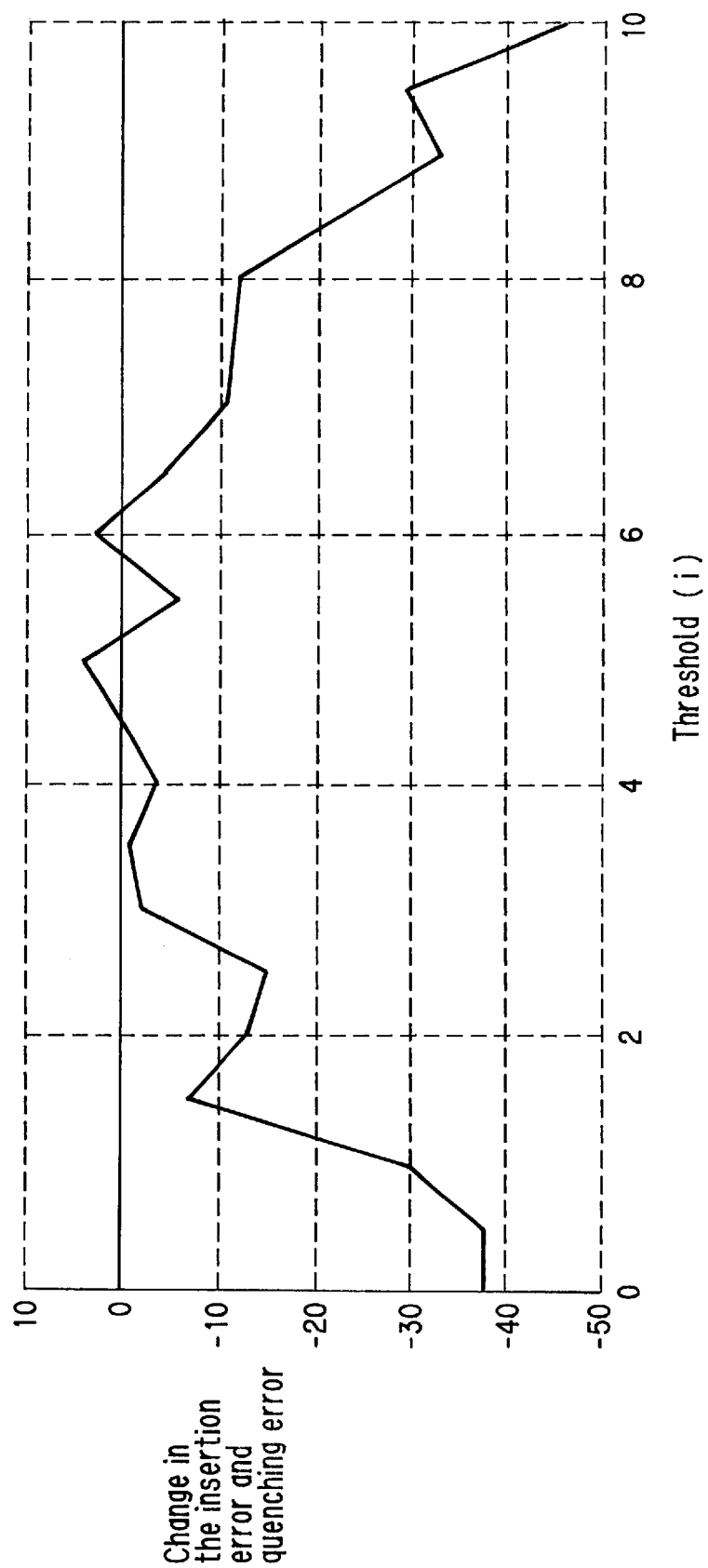
FIG. 10 is a characteristic curve (the amount of change in the data frequency with respect to the threshold) for explaining the operation (setting up of the optimum threshold) of the apparatus of the present invention.

If the characteristic in FIG. 9 is re-expressed with the difference (the amount of change) in the frequency of occurrence of data "1" with respect to the threshold voltage V, a roughly peak-shaped characteristic is obtained as shown in FIG. 10. With this characteristic, an error occurs resulting from the influence of noise or the like, hence it is not always a smooth characteristic, but if there is no occurrence of error, it shows a curve having a peak value. This peak value corresponds to the point of inflection of the characteristic shown in FIG. 10, and the threshold at this peak value becomes the optimum value for decreasing the quenching error and the insertion error.

Figure 14:
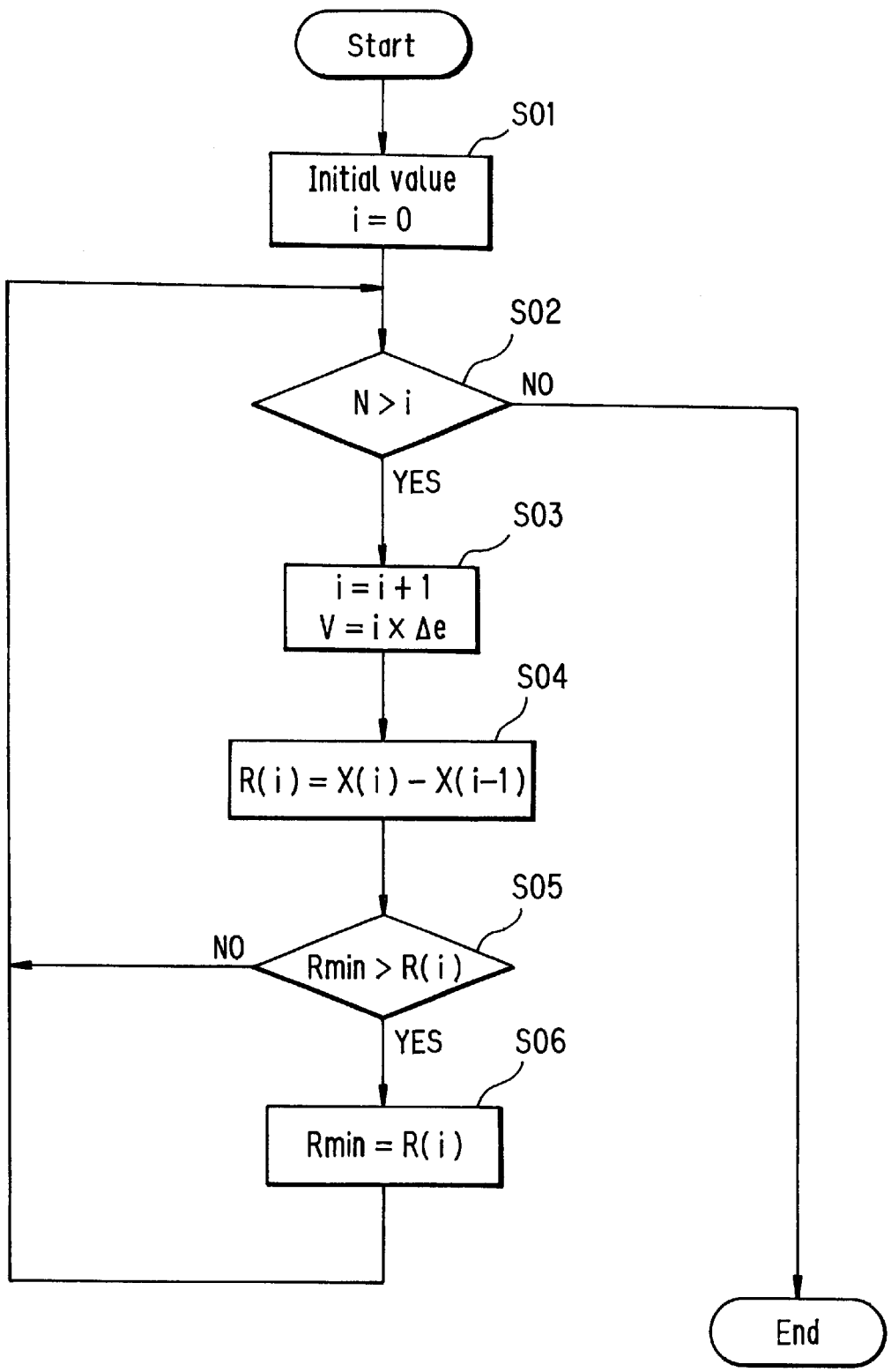
FIG. 14 is a flow chart for explaining the operation (flow for optimizing the threshold) of the apparatus of the present invention.

Accordingly, the frequency analyzing circuit 16 identifies the threshold which gives the peak value in the characteristic shown in FIG. 10 according to the flow for optimizing the threshold shown in FIG. 14 described later, and outputs a threshold switching signal to the threshold generation circuit 17. The threshold generation circuit 17 switches over according to this threshold switching signal to control the threshold voltage V which is provided to the comparator circuit 12A. As a result, the threshold of the data detection circuit 12 is set to an optimum value in which the insertion error and the quenching error are both suppressed.

In addition, in the above-mentioned frequency analysis, it was described that the output of the integration circuit 14 is converted to the digital data by the A/D conversion circuit 15, but it is not always necessary to convert it to the digital data to perform the frequency analysis, so long as the frequency analyzing circuit 16 can handle the analog signal.

As described above, after the threshold (threshold voltage V) of the data detection circuit 12 is fixed to an optimum value, the phase control of the clock generated by the PLL circuit 10 is then performed. The phase of this clock is controlled based on the analysis results of the waveform analyzing circuit 11 in which the threshold is optimized, in the manner described below, according to the phase control flow in FIG. 15 described later.

Figure 11:
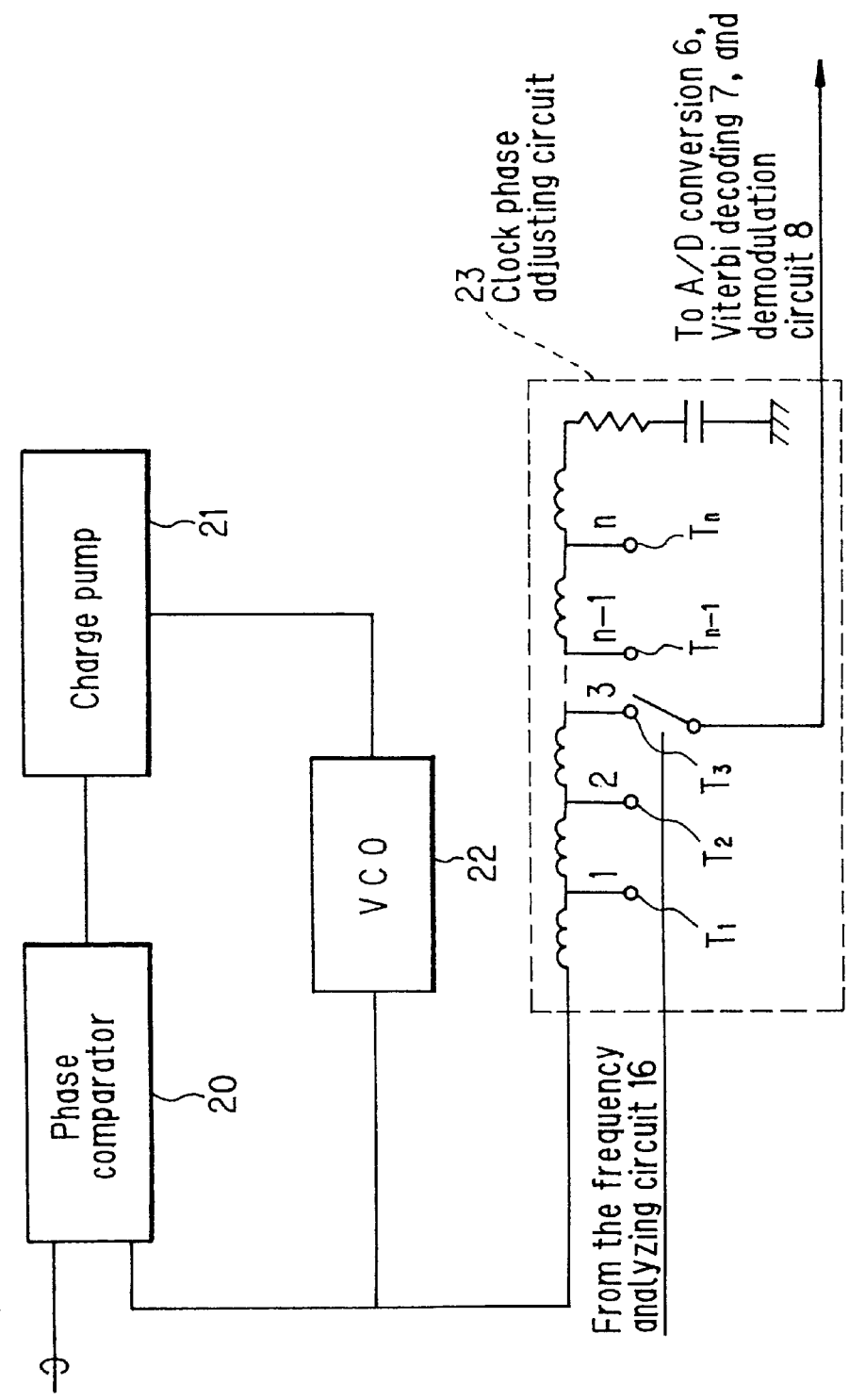
FIG. 11 is a block diagram of a PLL circuit provided in the apparatus of the present invention.

Here, the PLL circuit 10 comprises a phase comparator 20, a charge pump 21, a voltage control oscillator (VCO) 22, and a clock phase adjusting circuit 23, as shown in detail in FIG. 11, and a clock signal whose phase is locked to the output of the waveform equalizing circuit 4 is output from the VCO 22.

Furthermore, the clock phase adjusting circuit 23 comprises a plurality of L components which are connected in series, and a CR series circuit, and controls and outputs the phase of the clock signal being output form the VCO 22, by controlling a switch which designates the connecting point of each L component as a contact, based on the signal from the frequency analyzing circuit 16.

The clock (normally rotated clock) generated by the PLL circuit 10 having such a construction is input to the A/D conversion circuit 6 shown in FIG. 1, and used for the sampling clock for quantizing the reproduction signal. Therefore, if the phase of this clock is shifted from the optimum point, it becomes impossible to detect the data with a peak having a correct waveform, as shown in FIG. 16~FIG. 20 described later.

Figure 12:
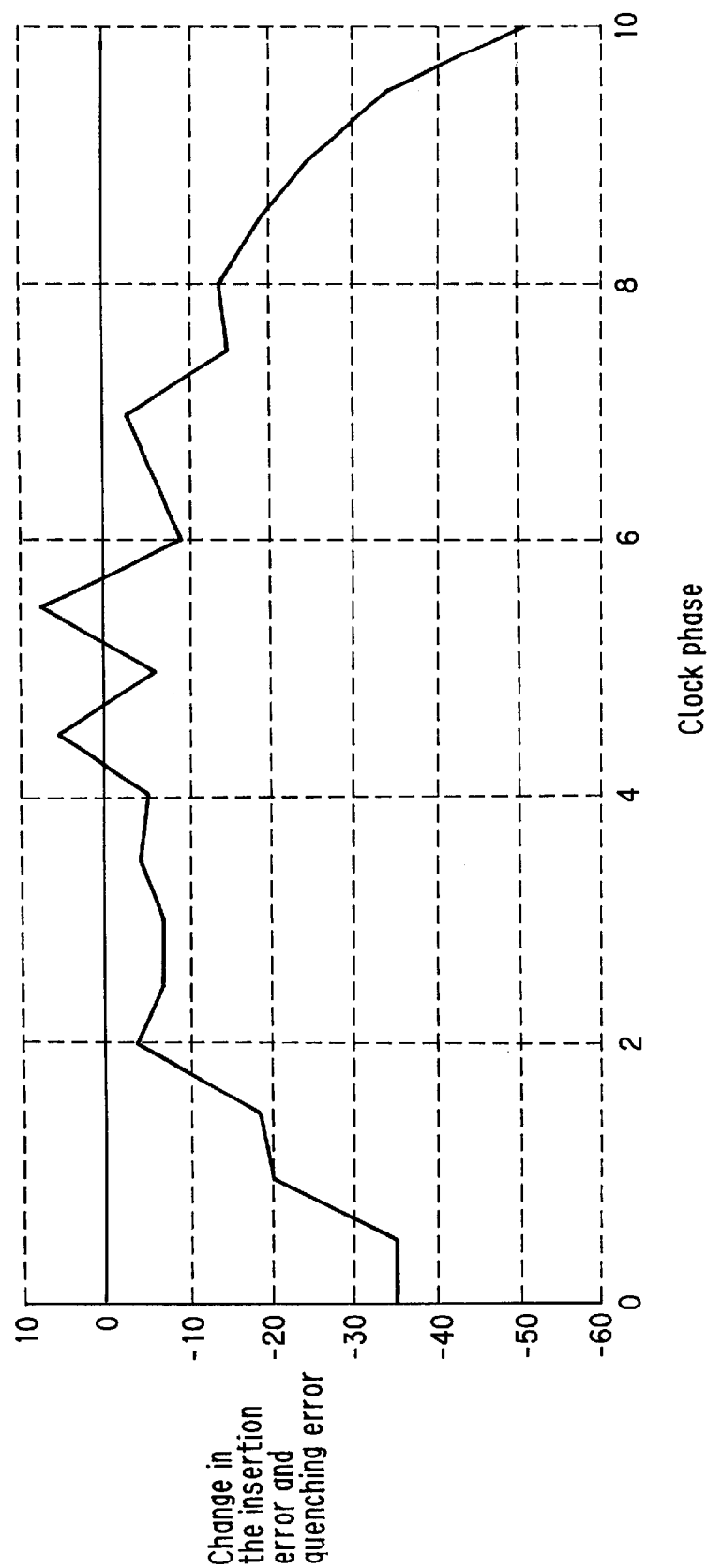
FIG. 12 is a characteristic curve (the amount of change in the data frequency with respect to the threshold) for explaining the operation (setting up of the optimum phase by means of the normally rotated clock) of the apparatus of the present invention.

As a result, a phenomenon similar to that of when the threshold of the data detection circuit 12 described above is changed occurs, and as shown in FIG. 12, either when the clock phase is too fast or too delayed, the frequency of occurrence of data "1" will decrease. Therefore, in this case, it is seen that the point where the frequency of occurrence of data "1" becomes largest is optimum as the phase point.

As described above, the optimum phase of the sampling clock can be obtained, but there may be a case where the frequency of occurrence of data "1" becomes maximum at a point other than the optimum phase point due to the influence of noise or the like. In such a case, even if the frequency of occurrence of data "1" is maximum, it is not always optimum as the phase point. In order to exclude the influence of noise and establish the optimum phase point, it is desirable to detect the frequency by the inversely rotated clock, as described below, after the detection of the normally rotated clock as described above.

The detection of the data frequency by means of the inversely rotated clock will now be described. When the phase of the reproduced waveform matches the phase of the normally rotated clock (when the clock phase is properly set), the detection result of the frequency of data "1" by means of the inversely rotated clock becomes minimum. Giving attention to this fact, it can be known whether the detection result by means of the normally rotated clock is proper or not from the detection result of the inversely rotated clock.

Figure 13:
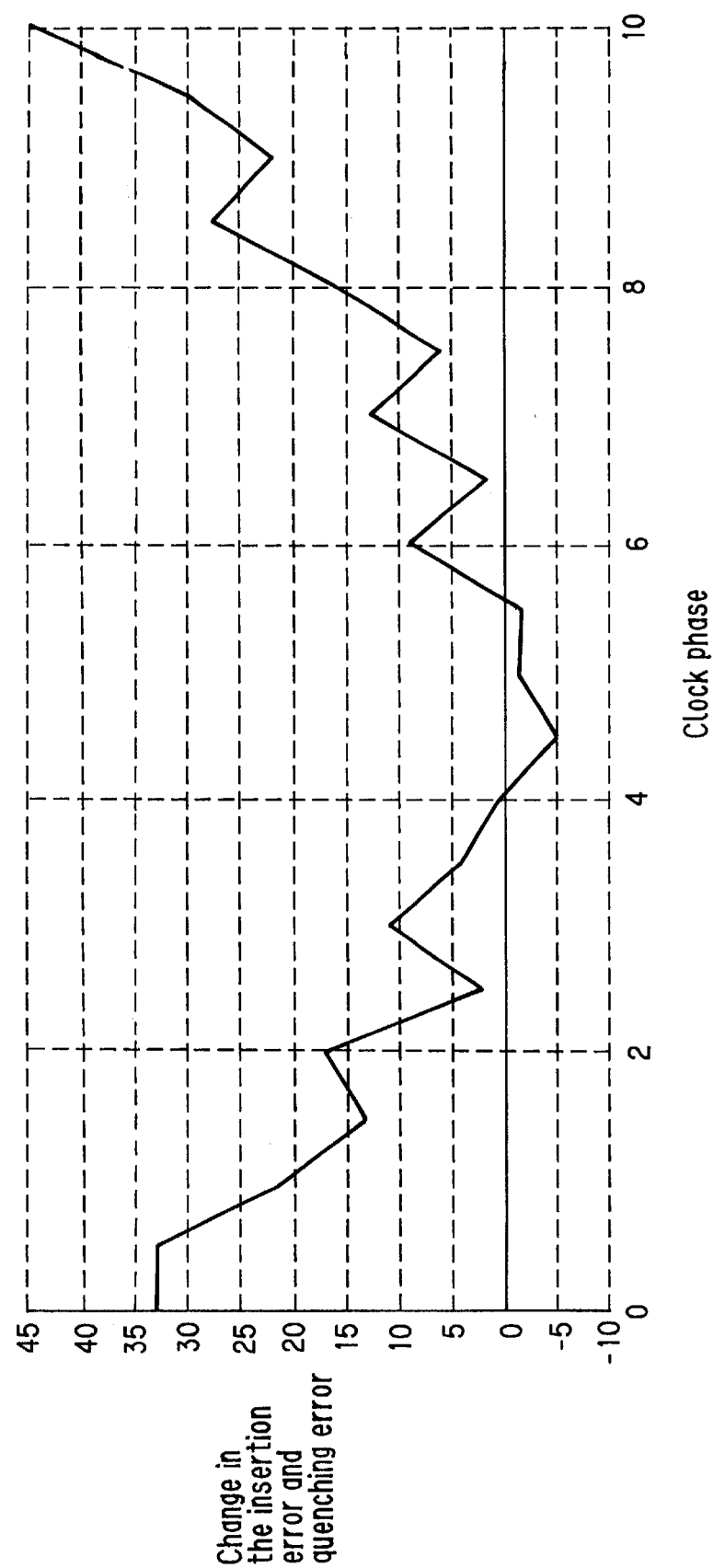
FIG. 13 is a characteristic curve (the amount of change in the data frequency with respect to the threshold) for explaining the operation (setting up of the optimum phase by means of the inversely rotated clock) of the apparatus of the present invention.

When the frequency detection is performed by the inversely rotated clock, as shown in FIG. 13, the change of the insertion error and/or the quenching error has a property of convex upward. On the contrary to the case of the normally rotated clock, the phase of the inversely rotated clock is adjusted to the optimum value by searching a phase point where the frequency of occurrence of data "1" becomes minimum, and switching over the clock phase adjusting circuit 23 in the PLL circuit 10 of FIG. 11.

Thus, by confirming that the frequency of occurrence of data "1" in the inversely rotated clock becomes minimum, it becomes possible to effectively exclude the erroneous operation resulting from noise or the like and to correctly determine the phase point of the normally rotated clock.

One example of the flow for optimizing the threshold voltage in the frequency analyzing circuit 16 shown in FIG. 5 will now be explained along the flow chart shown in FIG. 14.

In this explanation, the variable "i" is designated as a step level of the threshold, and it is so defined that when the step level i changes by 1, the threshold voltage changes by $\Delta e$. This step level i corresponds to the contact $P_0 \sim P_N$ of the switch of the threshold generation circuit 17 shown in FIG. 5. That is to say, when the step level i is 0, the contact of this switch is set to $P_0$, and as the step level i increases, the contact to be connected moves.

Moreover, the threshold voltage of the threshold generation circuit 17 with respect to the step level i is expressed by V(i), and the output level of the A/D conversion circuit 15a at this time is expressed by X(i). In addition, the difference (the amount of change) between X(i) and X(i−1) is designated as R(i). Moreover, $R_{min}$ is designated as a variable.

First, 0 is set as the initial value of the step level i, and the switch of the threshold generation circuit 17 shown in FIG. 5 is set to the contact $P_0$ (step S01). Then, it is discriminated whether the step level i does not exceed the set value N, and if not (step S02, YES), the step level i is increased to 1, and the switch of the threshold adjusting circuit 17 is connected to the contact $P_1$. The threshold voltage V(1) of the threshold adjusting circuit 17 at this step level 0 is:

$$V(1)=1\times\Delta e \text{ (step S03)}.$$

Furthermore, the output level X(1) of the A/D conversion circuit 15a at the step level 1 changes by R(1) with respect to the initial value X(0), therefore, it is expressed as:

$$X(1)=X(0)+R(1),$$

and from this expression, $$R(1)=X(1)-X(0)$$

is obtained (step S04).

Then, compare the variable $R_{min}$ with R(1), and if R(1) is smaller than the variable $R_{min}$ (step S05, YES), substitute the content of the variable $R_{min}$ by R(1) (step S06), on the contrary, if R(1) is larger than the variable $R_{min}$ (step S05, NO), leave the content of the variable $R_{min}$ as it is and return to step S02.

When the steps S02~S06 are repeated until the step level i reaches the upper limit value N, the least one among R(1)~R(N) will remain in the variable $R_{min}$. Then designate the threshold voltage at the step level corresponding to $R_{min}$ which is left on the last stage as the optimum value and as the set value, and end the step.

As described above, the difference in the output level of the A/D conversion circuit 15a, that is, the threshold voltage in which the change in the frequency of occurrence of data "1" is made minimum is specified, and the optimum threshold in the frequency analyzing circuit 16 is specified.

Figure 15:
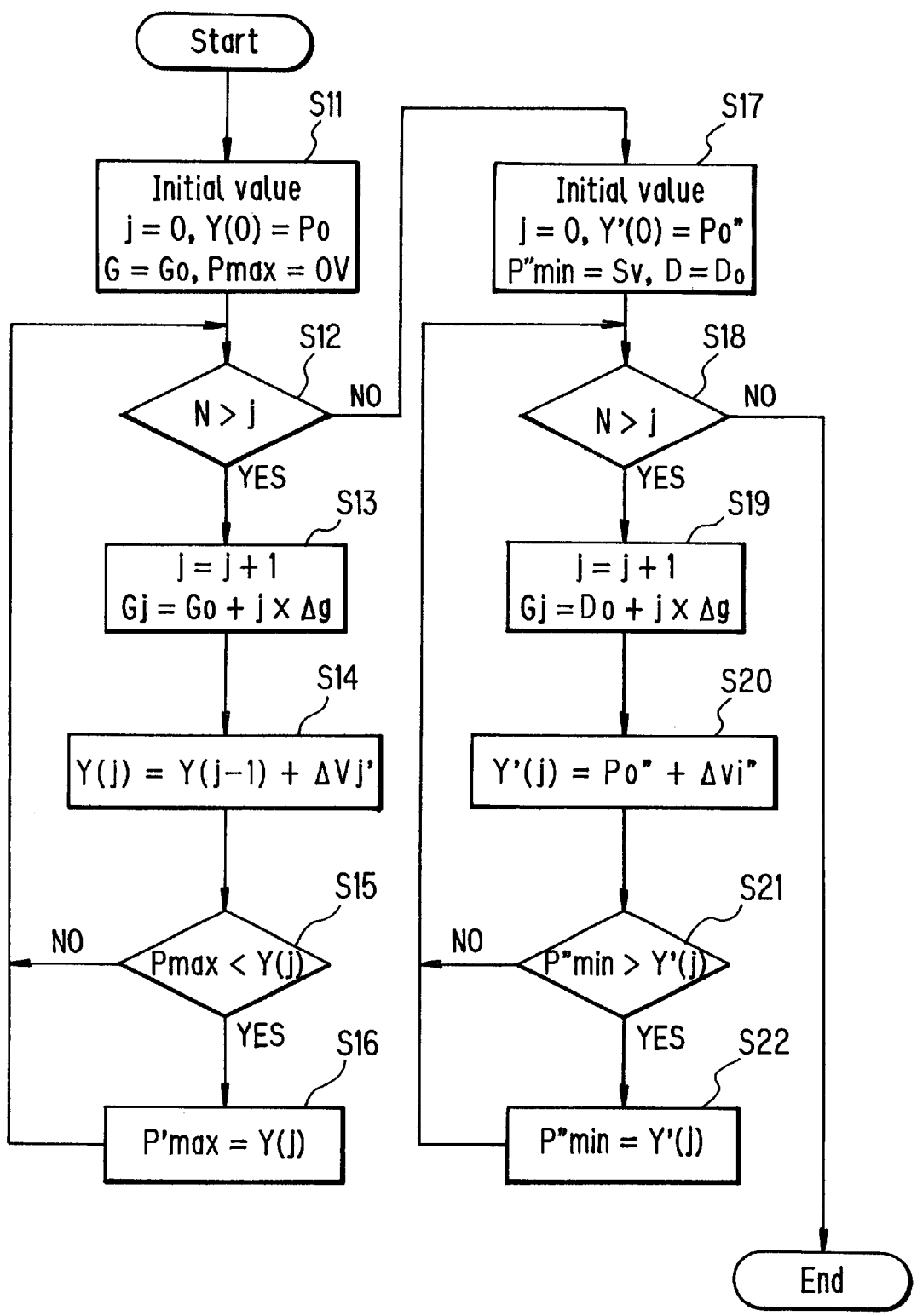
FIG. 15 is a flow chart for explaining the operation (flow for optimizing the clock phase) of the apparatus of the present invention.

One example of the phase optimizing flow of the clock generated by the PLL circuit 10 will now be explained with reference to FIG. 15.

Here, the variable "j" is designated as a step level of the phase delay, and it is so defined that when the step level changes by 1, the phase delay changes by $\Delta g$. The output level of the A/D conversion circuit 15a with respect to the step level; is expressed by Y(j). In addition, as the step level j of the phase delay is changed, the variable for storing the highest output level Y(j) of the A/D conversion circuit 15a is designated as $P_{max}$.

First, a delay in the leading edge of the clock in the input of the clock phase adjusting circuit 23 in FIG. 9 with respect to the peak of the reproduced waveform is designated as $G_0$, and the output level of the A/D conversion circuit 15a (the frequency of occurrence of "1") is designated as Y(0), to set each initial value (step S11).

Then, when the step level j does not exceed the upper limit value N (step S12, YES), the step level j is increased to 1, and the clock changing switch 25 in FIG. 11 is connected to the contact $T_1$. The phase delay $G_1$ in this state between the leading edge of the clock of the clock phase adjusting circuit 23 and the peak of the data waveform is calculated from the expression:

$$G_1 = G_0 + j \times \Delta g \text{ (step S13)}.$$

Furthermore, if the output value Y(1) of the A/D conversion circuit 15a is to be changed by $\Delta v_1'$ with respect to the initial value Y(0), $$Y(1) = Y(0) + \Delta v_1'$$

is obtained (step S14).

Then, compare Y(1) with the variable $P_{max}$, and if Y(1) is larger than the variable $P_{max}$ (step S15, YES), substitute the content of the variable $P_{max}$ by Y(1) (step S16), on the contrary, if Y(1) is smaller than the variable $P_{max}$ (step S15, NO), leave the content of the variable $P_{max}$ as it is and return to step S12.

When the above-mentioned steps S12~S16 are repeated until the step level j reaches the upper limit value N, the largest one among Y(0)~Y(N) will be left as the variable $P_{max}$. Then set the phase of the step level corresponding to $P_{max}$ which is left in the final stage as the optimum clock phase.

Thereby, the clock phase is set to the point where the frequency of occurrence of data "1" or "−1" is maximum. At this time, the clock phase nearly coincides with the phase of the waveform, and it is a state that the peak value higher than the threshold can be detected.

Figure 16:
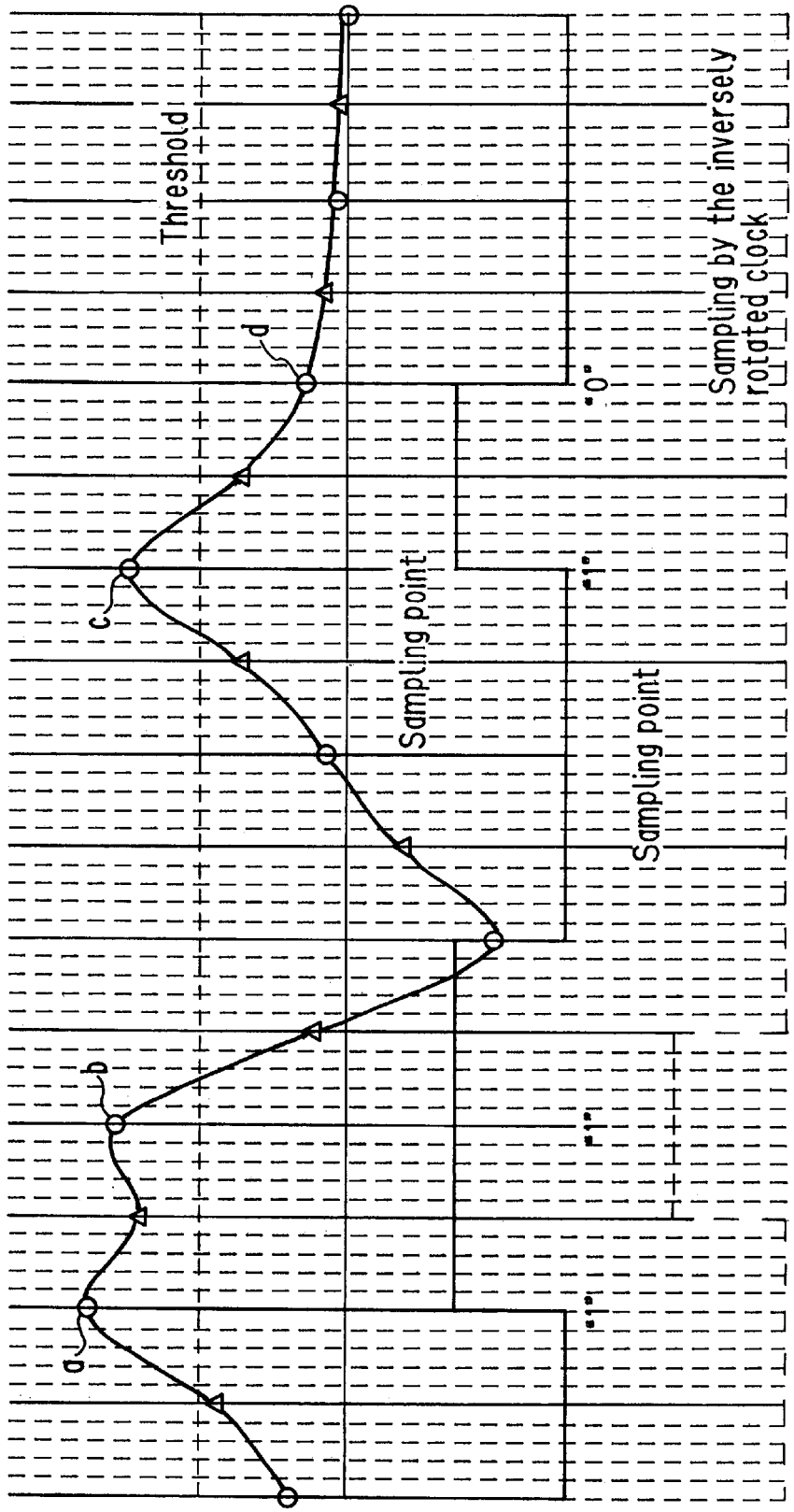
FIG. 16 is a waveform when the clock phase is set to an optimum value.
Figure 17:
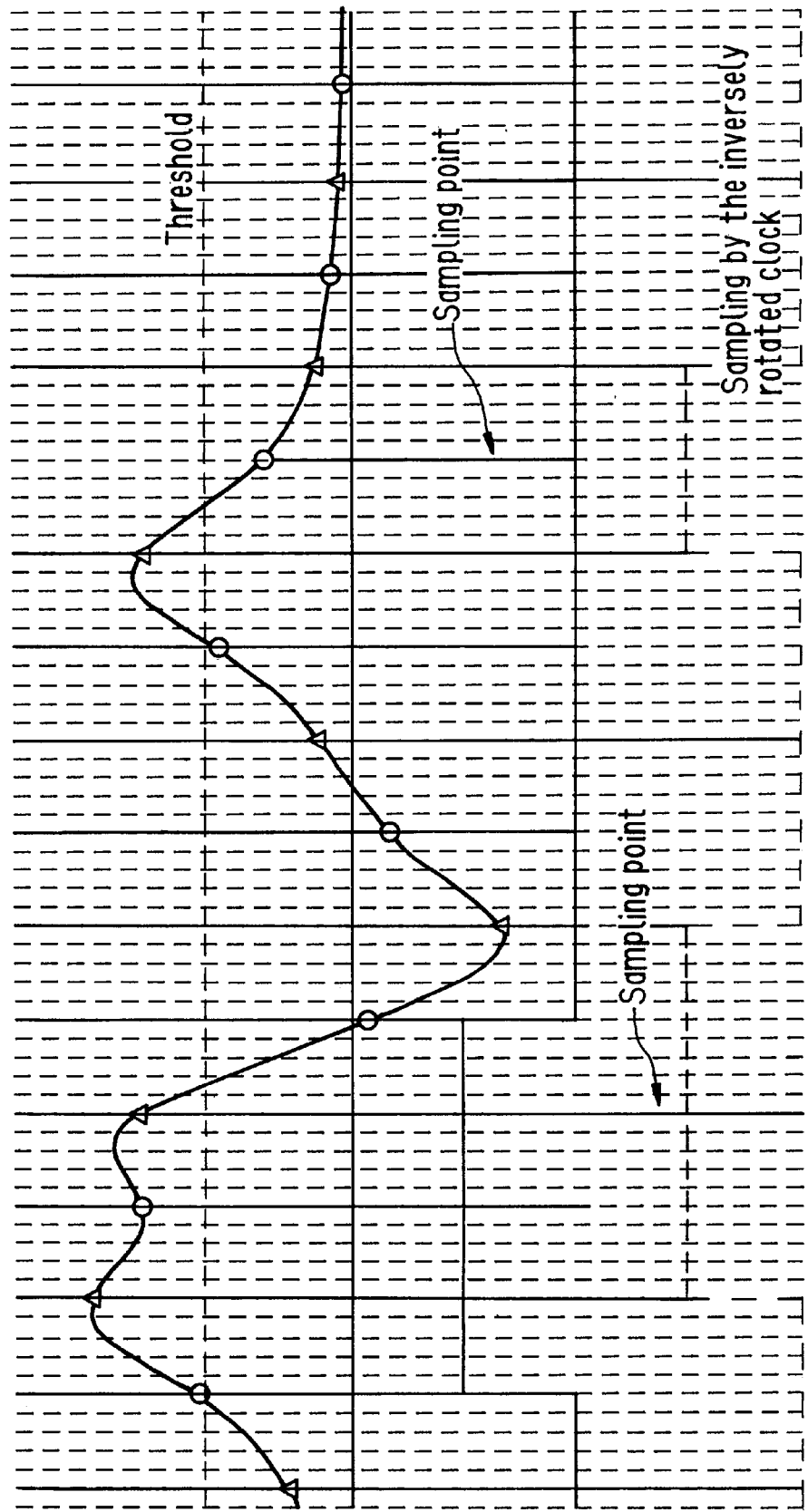
FIG. 17 is a waveform when the clock phase gains.

If it is explained with reference to FIG. 16, the waveform detection of "1", "0" and "−1" is performed, depending upon whether the DC level is higher or lower than the threshold at the sampling point. Therefore, since at either point of a, b, and c, the DC level is higher than the threshold, "1" can be detected. On the contrary, at point d, the DC level is lower than the threshold, thereby "0" is detected. Thus, when the clock phase is shifted, and the sampling point is shifted, "1" cannot be detected, thereby the quenching error increases. Accordingly, when the clock phase coincides with the waveform phase, the frequency of occurrence of data "1" or "−1" becomes largest.

Now, returning to FIG. 15, after the detection by the normally rotated clock as described above, the data detection is performed using the inversely rotated clock (steps S17~S22). Here, as in the case of normally rotated clock, j is designated as the step level of the phase delay, and it is defined that the phase delay changes by $\Delta g$ due to each step change. The output level of the A/D conversion circuit 15b with respect to the j-th step level is then designated as Y'(j). In addition, changing the step level j of the phase delay, Y'(j) in which the output level is lowest is designated as $P''_{mix}$.

First, a delay in the leading edge of the inversely rotated clock with respect to the peak of the data waveform is designated as $D_0$, and the output level of the A/D conversion circuit 15b (the frequency of occurrence of "1") is designated as Y'(0), to set each initial value (step S17). In addition, in the case of the normally rotated clock, the delay in the leading edge of the clock in the input of the phase adjusting circuit 23 becomes $G_0$.

Then, it is determined whether the step level j does not exceed the upper limit value N, and if not (step S18, YES), the step level j is increased, and the clock changing switch in FIG. 11 is connected to the contact $T_1$. The phase delay $D_1$ in this state between the leading edge of the inversely rotated clock of the clock phase adjusting circuit 23 and the peak of the data waveform is calculated from the expression:

$$D_1 = D_0 + 1 \times \Delta g \text{ (step S19)}.$$

Thereby, the output value Y'(1) of the A/D conversion circuit 15b changes by $\Delta v_1''$ with respect to the initial value Y''(0), and $$Y'(1) = Y'(0) + \Delta v_1''$$

is obtained (step S20).

Then, compare Y'(1) with the variable $P''_{min}$, and if Y'(1) is smaller than the variable $P''_{min}$ (step S21, YES), substitute the content of the variable $P''_{min}$ by Y'(1) (step S22), on the contrary, if Y'(1) is larger than the variable $P''_{min}$ (step S21, NO), leave the content of the variable $P''_{min}$ as it is and return to step S18.

When the above-mentioned steps S18~S22 are repeated until the step level j reaches the upper limit value N, the least one among Y'(0)~Y'(N) will be left as the variable $P''_{min}$. Then set the phase of the step level corresponding to $P''_{min}$ which is left in the final stage as the optimum phase of the inversely rotated clock. Thereby, the clock phase of the inversely rotated clock is set to the point where the frequency of occurrence of data "1" or "−1" is minimum.

When the phase of the inversely rotated clock is changed, the frequency of occurrence of data "1" changes, as shown in FIG. 13. Furthermore, as shown in FIG. 16~FIG. 20, even if the clock phase is shifted to the front side (FIG. 17, FIG. 18) of the optimum value (FIG. 16), or shifted to the back side (FIG. 19, FIG. 20) of the optimum value (FIG. 16), data "1" or "−1" is counted larger than the actual number.

Figure 18:
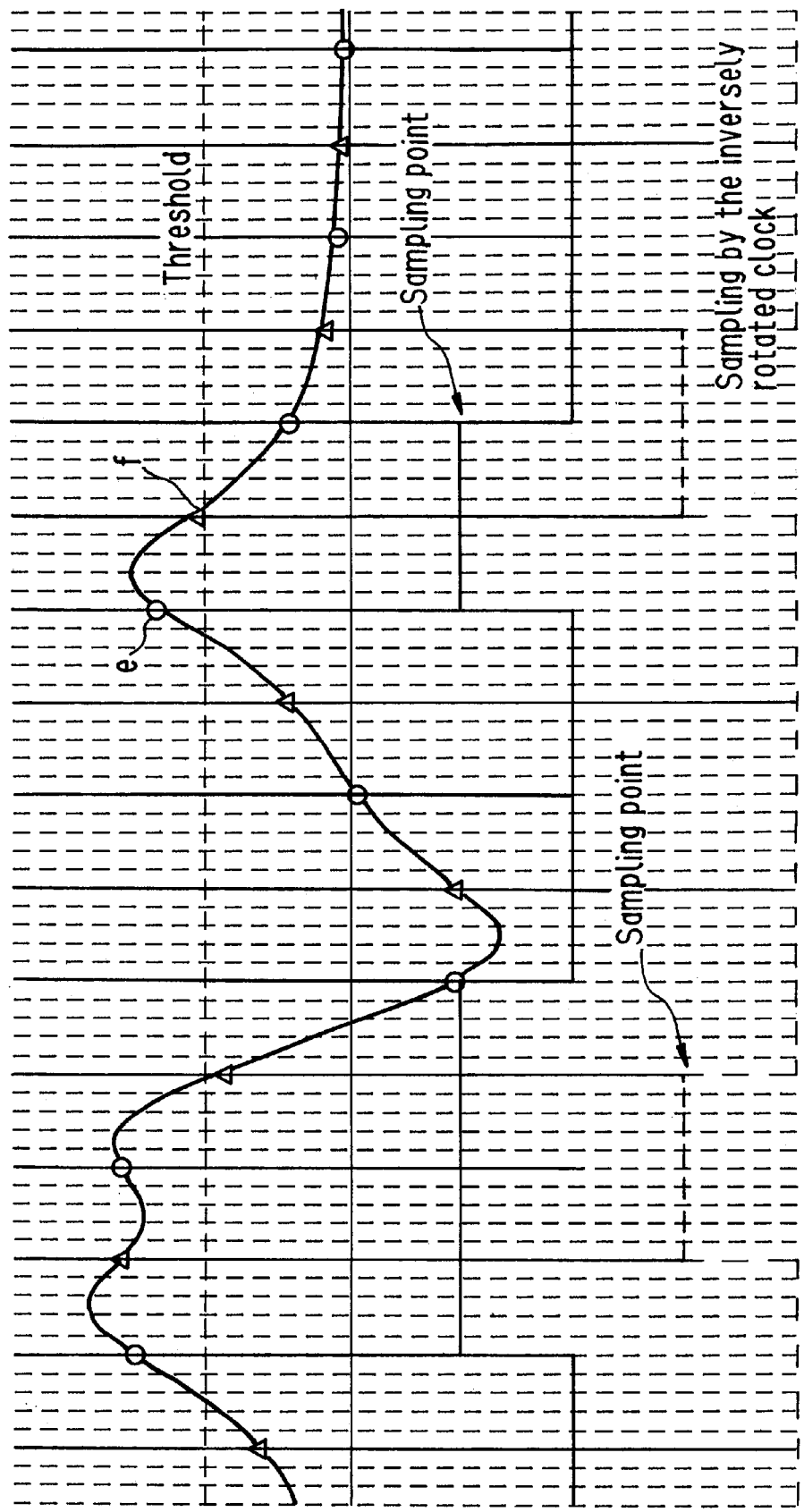
FIG. 18 is a waveform when the clock phase gains.
Figure 19:
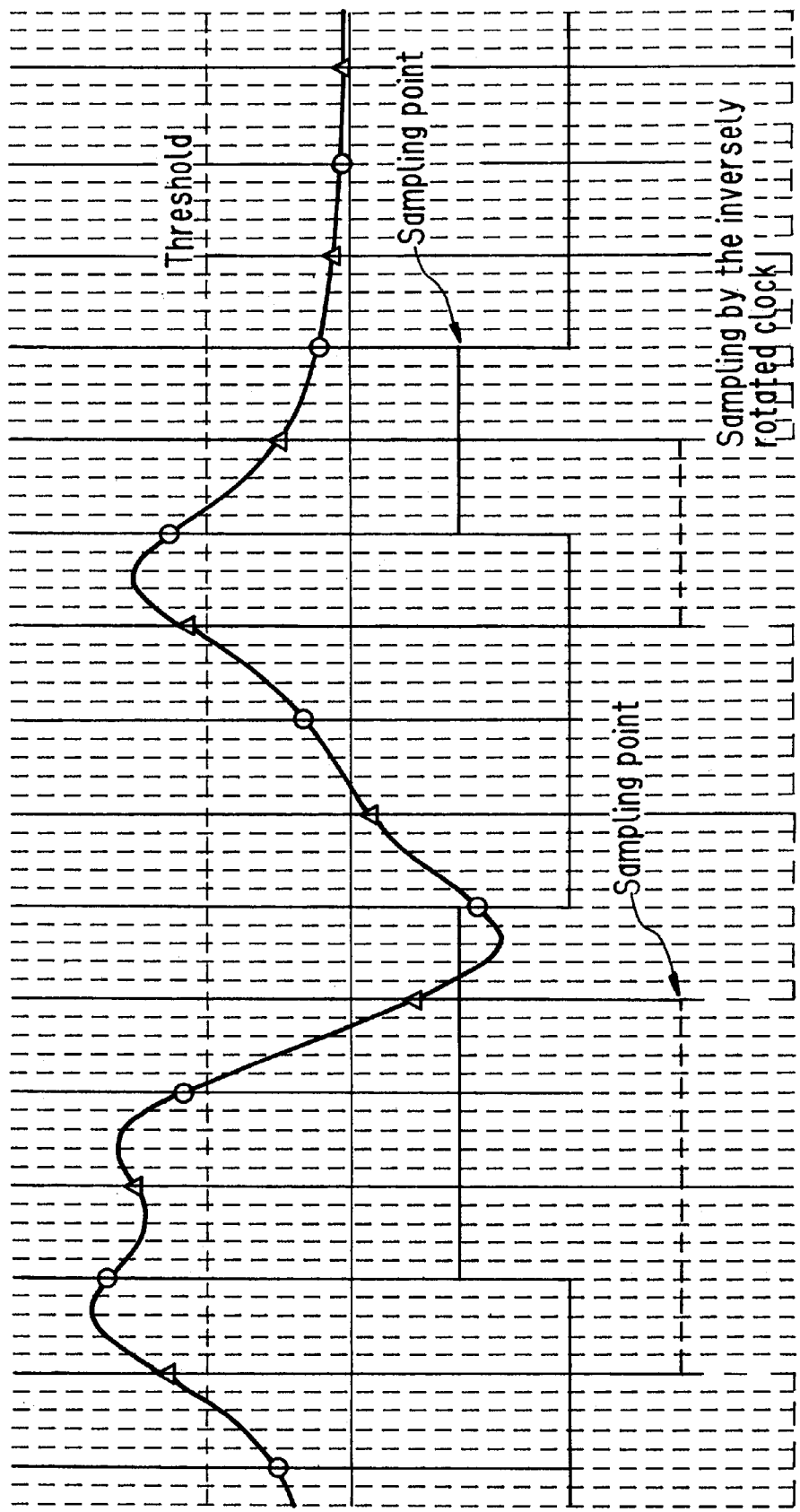
FIG. 19 is a waveform when the clock phase loses.
Figure 20:
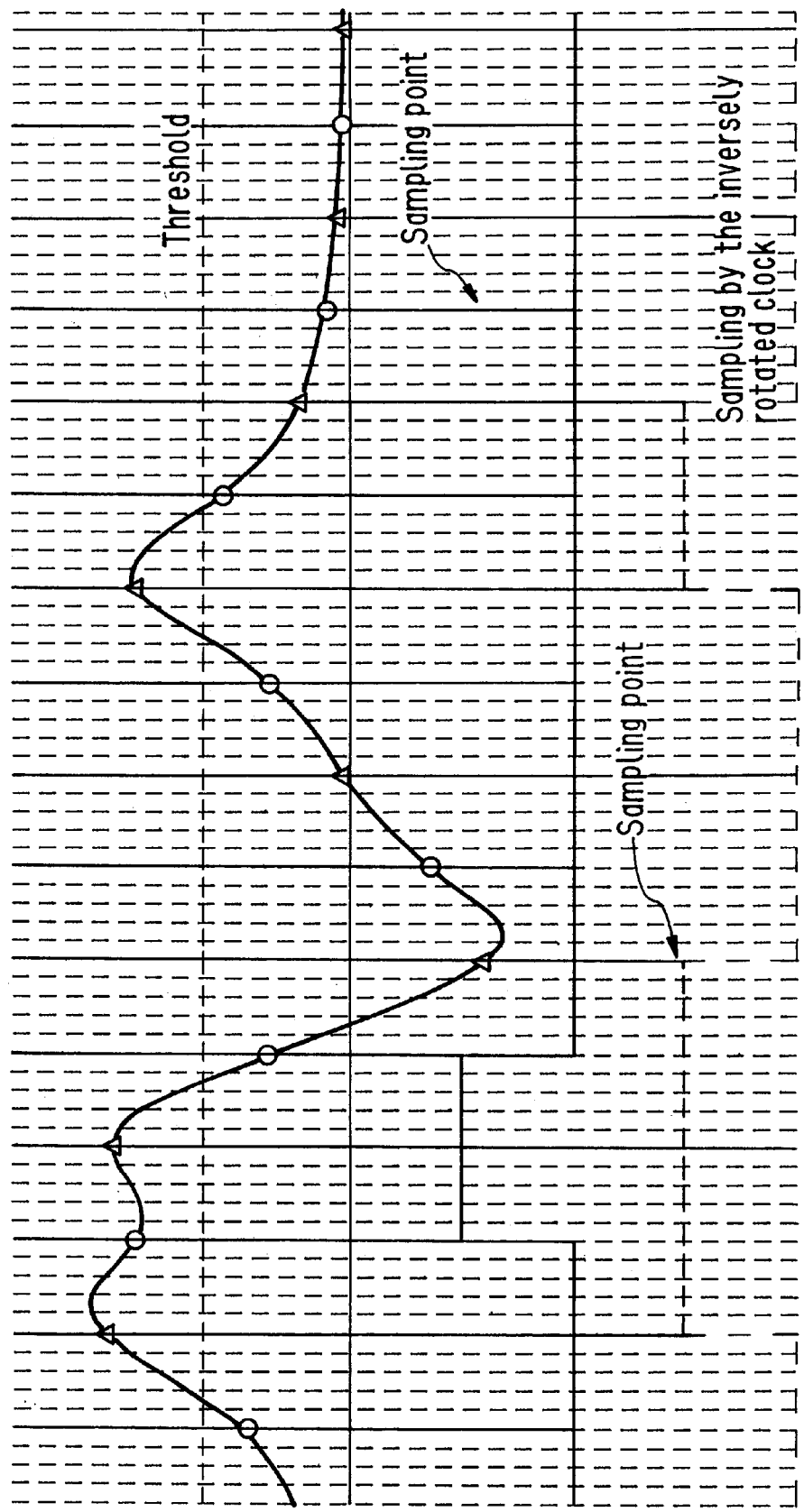
FIG. 20 is a waveform when the clock phase loses.

This is because since the skirts of the waveform is broadened, if the leading edge of the clock does not match the peak of the data accurately, the waveform is detected not only at the sampling point (point e) of clock but also at the sampling point of the inversely rotated clock (point f), as at point f in FIG. 18.

That is to say, the normally rotated clock which is the normal clock detects the waveform to determine the timing for converting from the analog data to the digital data, and if the time is shifted, it cannot detect the peak value of the data accurately, and cannot discriminate the data as "1" (the occurrence of the quenching data).

On the other hand, the timing of the inversely rotated clock is located intermediate between the data detected as "1" and the data detected as "0". Accordingly, if the phase of this inversely rotated clock gains, the inversely rotated clock may detect as a data the expansion of the waveform generated due to the waveform interference or the like at the point where the data changes from "1" to "0", and may often discriminate the data as "1".

On the contrary, if the phase of this inversely rotated clock delays, the inversely rotated clock may detect as a data the expansion of the waveform generated due to the waveform interference or the like at the point where the data changes from "0" to "1", and may often discriminate the data as "1". Accordingly, it can be seen that the case that the data is discriminated as "1" becomes least at the optimum sampling point by means of the inversely rotated clock.

Thus, by controlling the phase of the inversely rotated clock as well as the normally rotated clock, it becomes possible to adjust to the optimum clock phase.

Incidentally, the threshold optimizing flow and the clock phase optimizing flow described above is not limited to the one shown in FIG. 14 and FIG. 15. That is, the threshold optimizing flow may be any flow so long as the threshold for lessening the insertion error and the quenching error can be identified. The clock phase optimizing flow may be any flow so long as the clock phase where the frequency of occurrence of data becomes largest or least can be identified.

Furthermore, in this embodiment, the phase of the inversely rotated clock is optimized so that the frequency of occurrence of data becomes minimum, but for example, when the clock phase is to be determined based mainly on the detection result by the normally rotated clock, the detection result by the inversely rotated clock becomes supplemental. In this case, the frequency of occurrence of data detected by the inversely rotated clock is not always necessary to be minimum, and it is sufficient to confirm that it does not exceed a predetermined value.

Therefore, when the normally rotated clock is mainly used and the inversely rotated clock is used supplementarily, it may be so constituted that the clock phase is set by making the detection result by the normally rotated clock effective, only when the frequency of occurrence of data by the inversely rotated clock does not exceed the predetermined value.

As described above, according to the apparatus of this embodiment, the clock phase is so controlled that the frequency of occurrence of data becomes nearly maximum with the normally rotated clock, and becomes minimum with the inversely rotated clock. The phenomenon that the clock phase is shifted is a similar phenomenon when the threshold of the data detection circuit is changed, at a point where the amplitude level of the waveform cannot be correctly detected. Accordingly, as in the case that the afore-mention threshold is controlled, it can be considered that it is intended to make the quenching error and the insertion error minimum.

As described above, according to the present invention, the effects described below can be obtained.

That is to say, it is so constituted that the quenching error and insertion error are indirectly detected by analyzing the frequency of occurrence of data, so that the clock phase for quantizing the reproduction signal is controlled, hence the clock phase can be optimally set rapidly. Furthermore, the phase adjustment of the clock on the production stage becomes unnecessary, and even if the kind of the recording medium is changed, the data can be reproduced always in an optimum state.

What is claimed is:

1. A digital recording/reproduction apparatus which quantizes and decodes an information signal reproduced from a recording medium based on a sampling clock, comprising:
   detection means for detecting a frequency of occurrence of a specific first data value contained in said information signal, and
   phase control means for controlling a phase of said sampling clock based on an analog signal representing the frequency of occurrence of the specific first data value detected by said detection means.

2. The digital recording/reproduction apparatus according to claim 1, wherein the detection means includes:
   means for comparing the information signal with a threshold and converting the information signal into a binary format, and
   threshold control means for controlling said threshold based on a frequency of occurrence of either one of the first specific value and a second specific value contained in the output of said means for comparing and converting the information signal.

3. The digital recording/reproduction apparatus according to claim 1, wherein the phase control means controls the phase of said sampling clock based on the detection results of the detection means, so that the frequency of occurrence of the first specific data value contained in the signal obtained by quantizing the information signal based on the positive phase signal of the sampling clock is maximized, or the frequency of occurrence of the first specific data value contained in the signal obtained by quantizing the information signal based on the negative phase signal of the sampling clock is minimized.

4. The digital recording/reproduction apparatus according to claim 1, wherein the detection means includes means for comparing the information signal with a threshold and converting the information signal into a binary format, and threshold control means for controlling said threshold based on the frequency of occurrence of either one of the first specific value and a second specific value contained in the output of said means for comparing and converting the information signal, the phase control means controlling the phase of said sampling clock based on the detection results of the detection means, so that the frequency of occurrence of either of the specific data values contained in the signal obtained by quantizing the information signal based on the positive phase signal of the sampling clock is maximized, or the frequency of occurrence of either of the specific data values contained in the signal obtained by quantizing the information signal based on the negative phase signal of the sampling clock is minimized.

5. The digital recording/reproduction apparatus according to claim 2, wherein the threshold control means controls the threshold so that said frequency of occurrence is minimized based on the amount of change in the frequency of occurrence of either one of the first and second specific values contained in the output of the means for comparing and converting the information signal.

6. The digital recording/reproduction apparatus according to claim 4, wherein the threshold control means controls the threshold so that said frequency of occurrence is minimized based on the amount of change in the frequency of occurrence of either one of the first and second specific values contained in the output of the means for comparing and converting the information signal.

7. A digital recording/reproduction apparatus, comprising:
   a sampling clock;
   a data detector circuit connected to said sampling clock for processing an information signal received from a recording medium,
   wherein the data detector circuit detects a presence of a voltage level in the information signal greater than an adjustable threshold voltage, wherein the presence of the voltage level indicates a first data value in the information signal;
   a frequency analyzing circuit coupled to the data detector circuit and the sampling clock for determining a frequency of occurrence of the first data value in the information signal; and
   a clock phase adjusting circuit for adjusting a phase of said sampling clock based on a first output from said frequency analyzing circuit,
   wherein said adjustable threshold voltage is set based on a second output of said frequency analyzing circuit,
   wherein said first output and said second output are determined so as to maximize the frequency of occurrence of the first data value.

8. The digital recording/reproduction apparatus of claim 7, further comprising an integration circuit and an A/D conversion circuit between said data detector circuit and said frequency analyzing circuit, wherein said integration circuit integrates a pulse output of said data detection circuit, and said A/D conversion circuit provides a digital signal to the frequency analyzing circuit based on an output of said integration circuit.

9. The digital recording/reproduction apparatus of claim 7, wherein said second output is determined so as to maximize the frequency of occurrence of the first data value when said data detector circuit uses a positive phase signal of said sampling clock.

10. The digital recording/reproduction apparatus of claim 7, wherein said second output is determined so as to minimize the frequency of occurrence of the first data value when said data detector circuit uses a negative phase signal of said sampling clock.

11. The digital recording/reproduction apparatus of claim 9, wherein said second output is also determined so as to minimize the frequency of occurrence of the first data value when said data detector circuit uses a negative phase signal of said sampling clock.

12. The digital recording/reproduction apparatus of claim 7, wherein said data detector circuit provides an output in a binary format.

13. The digital recording/reproduction apparatus of claim 12, wherein said binary format is a binary pulse stream.

14. The digital recording/reproduction apparatus of claim 7, wherein said first data value is a "1".

15. The digital recording/reproduction apparatus of claim 7, wherein said first data value is a "−1".

16. The digital recording/reproduction apparatus of claim 7, wherein said frequency analyzing circuit determines either the frequency of occurrence of the first data value or a frequency of occurrence of a second data value in the information signal.

17. The digital recording/reproduction apparatus of claim 7, wherein said recording medium is a magnetic tape.

18. The digital recording/reproduction apparatus of claim 17, wherein said information signal is recorded using a partial response class 4 coding technique.

19. A method of phase-adjusting a sampling clock in a digital recording/reproduction apparatus, comprising:

detecting a frequency of occurrence of a data value in an information signal;

adjusting a threshold value used to detect the frequency of occurrence; and adjusting a phase of the sampling clock, wherein the threshold value and the phase are adjusted so as to either maximize or minimize the frequency of occurrence of the data value in the information signal.

20. The method of claim 19, wherein the threshold and the phase are adjusted so as to maximize the frequency of occurrence of the data value using a normally rotated sampling clock, and to minimize the frequency of occurrence of the data value using an inversely rotated clock signal.

21. The method of claim 19, wherein the digital recording/reproduction apparatus uses a magnetic tape and a partial response class 4 coding technique.

* * * * *